United States Patent [19]
Pollard

[11] 3,953,218

[45] *Apr. 27, 1976

[54] PIGMENT DISPERSION

[75] Inventor: Edward T. Pollard, Norwalk, Ohio

[73] Assignee: PMS Consolidated, Somerset, N.J.

[ * ] Notice: The portion of the term of this patent subsequent to Apr. 17, 1990, has been disclaimed.

[22] Filed: Apr. 16, 1973

[21] Appl. No.: 351,641

Related U.S. Application Data

[60] Continuation-in-part of Ser. No. 129,968, March 31, 1971, Pat. No. 3,728,143, and a continuation-in-part of Ser. No. 310,022, Nov. 28, 1972, Pat. No. 3,844,810, which is a division of Ser. No. 129,968, March 31, 1971, Pat. No. 3,728,143.

[52] U.S. Cl.................... 106/19; 106/27; 106/31; 106/250; 106/266; 106/272; 106/308 F

[51] Int. Cl.²........................................ C09D 11/00

[58] Field of Search ................ 106/19, 27, 31, 272, 106/308, 250, 266

[56] References Cited
UNITED STATES PATENTS

| | | | |
|---|---|---|---|
| 2,155,861 | 4/1939 | Hughes | 106/27 |
| 2,442,972 | 6/1948 | Edelstein | 106/308 N |
| 2,971,922 | 2/1961 | Clem | 106/308 N |
| 3,252,820 | 5/1966 | Vignolo | 106/272 |
| 3,266,924 | 8/1966 | Haeska | 106/272 |
| 3,354,111 | 11/1967 | Hendersen | 106/308 N |
| 3,723,153 | 5/1973 | Yoshraki | 106/272 |
| 3,728,143 | 4/1973 | Pollard | 106/288 Q |

FOREIGN PATENTS OR APPLICATIONS

| | | |
|---|---|---|
| 399,268 | 10/1933 | United Kingdom |
| 453,786 | 9/1936 | United Kingdom |
| 743,629 | 1/1956 | United Kingdom |
| 1,046,724 | 10/1966 | United Kingdom |
| 1,099,336 | 1/1968 | United Kingdom |
| 1,133,414 | 11/1968 | United Kingdom |
| 1,191,205 | 5/1970 | United Kingdom |
| 1,325,371 | 8/1973 | United Kingdom |
| 971,189 | 9/1964 | United Kingdom |
| 1,056,507 | 1/1967 | United Kingdom |
| 1,220,795 | 1/1971 | United Kingdom |
| 1,166,366 | 10/1969 | United Kingdom |

OTHER PUBLICATIONS
Condensed Chem. Dict., 1961, p. 517.

*Primary Examiner*—Theodore Morris
*Attorney, Agent, or Firm*—Christen & Sabol

[57] ABSTRACT

Fatty acid amide coated pigments are obtained and used to formulate with thermoplastic or thermoset materials. The colors of the pigments are fully developed and extremely high pigment loadings are obtained. The coated pigments are formed by admixing the pigment with melted fatty acid amide; solidifying the material by cooling it; grinding the material; and separating out the fines. The coated pigment particles are compounded with thermoplastic or thermoset materials by low shear means, such as, injection molding. An improved form of the coated pigments can be obtained by admixing the melted fatty acid amide and the pigment; extruding the admixture to form a creamy mass; solidifying and forming the creamy mass by passing it through cold and forming rollers; grinding the resultant wafer-like material; and separating out the fines. Liquid compositions of fatty acid amide coated pigments can be obtained by admixing pigment particles and a fatty acid amide which is liquid at room temperature or by admixing a fatty acid amide, pigment particles and a non-solvent diluent which is liquid at room temperature.

23 Claims, No Drawings

PIGMENT DISPERSION

This application is a continuation-in-part application of copending U.S. Ser. No. 310,022, filed Nov. 28, 1972 now U.S. Pat. No. 3,844,810, which is a divisional application of U.S. Ser. No. 129,968, filed Mar. 31, 1971; now U.S. Pat. No. 3,728,143 and this application is a c-i-p copending Ser. No. 129,968.

PRIOR ART

U.S. Pat. No. 2,971,922 teaches compositions of clay rendered organophilic by admixture with a fatty acid amide. The admixture can contain from 30 to 75 percent of the fatty acid amide, the remainder being clay. The fatty acid amide is heated to 250° to 400°F.; the clay added (preferably with stirring); the admixture allowed to cool; and the admixture is then ground to a fine waxy powder. The organophilic clay is used in the production of foundry core compositions.

U.S. Pat. No. 2,442,972 teaches treating textiles, nylon vinyl resins and cellophane with aqueous dispersions containing pigments, coupling agents, such as, fatty acid amides of acyl or hydroxyacyl amines, and cationic materials, such as, mono-amides obtained by the condensation of amines with one mole of a fatty acid. The pigments, which are dispersed in fatty acid amides and water, are used on textiles, the result being a flattening or dulling of the surface lustre (see col. 6, lines 61 to 66). Thus one of ordinary skill is lead away from investigating the use of fatty acid amides to increase the lustre of pigments dispersed in thermoplastics.

U.S. Pat. No. 3,441,507 teaches coating powdered peroxygen compounds with a combination of (a) a nitrogenous condensation product of a fatty acid and alkyl amine or alkylol amine and (b) an ester of glycerin and a fatty acid. The product is used in detergent products.

U.S. Pat. No. 3,328,185 teaches placing filler particles of calcium carbonate or carbon black into a melted polyamide and admixing them, thus forming a hot melt dispersion. The dispersion is maintained at a hot melt temperature. (The dispersion, in Example XIV, was extruded into a rod. The rod was cut and the pieces were allowed to solidify to form pellets. The pellets were place in a drum and the temperature was maintained at 100°F.) The dispersions are used in bonding the side seams in paper cups and cans (tin-plated sheet).

U.S. Pat. No. 2,385,379 teaches compacting calcium carbonate by passing it through a roller. The rollers can be treated (coated) before compacting with a variety of substances such as, fatty acids or salts of fatty acids, but nowhere is any fatty acid amide mentioned. U.S. Pat. No. 2,192,956 discloses treating a slurry of a pigment and water with a cation-active agent which is an ester formed form a fatty acid and a hydroxy amine; drying the treated pigment; and grinding the pigment. The treated pigment was to be used in the field of textiles. U.S. Pat. No. 2,841,504 teaches surface coating calcium carbonate pigments for use as rubber reinforcing pigments, in printing inks and surface-coating compositions. The calcium carbonate is coated with a higher amine and a fatty acid by adding emulsions of the amine and fatty acid to aqueous slurries of the calcium carbonate. The emulsion is prepared by melting together the amine and fatty acid and then adding the melt to boiling water. Or, an amine and calcium carbonate aqueous solution is prepared; the solution dried; and a fatty acid incorporated on the dried product by hammermilling. Several other slurry and solvent methods of preparation are taught. U.S. Pat. No. 2,929,091, is similar and also does not teach applicant's invention.

U.S. Pat. No. 3,075,849 discloses the use of a salt of a basic polyamide (of an aliphatic polyamine and an unsaturated higher fatty acid) with a higher fatty acid as a suspending agent for pigments in paints. U.S. Pat. No. 3,278,479 teaches polyester resins containing kaolin clay coated with an ethoxylated amide. U.S. Pat. No. 3,266,924 teaches adding a fatty acid amide slip agent to a mixing zone which contains siliceous material particles and which is at a temperature between 160° and 240°F. The admixture is cooled so that the amide solidifies and the resultant powder is recovered. The powder is used in polyethylene and copolymers thereof as a slip and antiblocking agent.

U.S. Pat. No. 3,075,849 disclosed a pigmented paint which is a pigment suspended in a vehicle. The suspension contains a suspending agent which is a salt of the basic polyamide (of an aliphatic polyamine and an unsaturated higher fatty acid) with a higher fatty acid.

U.S. Pat. No. 2,638,702 teaches making an organophilic pigment. The pigment is slurried with an aqueous dispersion of a low molecular weight condensate of an alkylated methylol melamine and a N-alkylol fatty acid amide. The mixture is dried and then cured at an elevated temperature. The pigment is stated to be useful in emulsion points and lithographic inks.

U.S. Pat. No. 3,252,820 discloses a rheological composition of a co-ground mixture of a pigment extender and a thixotropic wax powder mixture of a polyamide of hydroxystearate with glyceryl trihydroxystearate. The extenders could be clay, talc, silica or titanium dioxide. The wax mixture and extender can be heated or melted together before grinding. The composition is used in paints. U.S. Pat. No. 3,313,713 discloses coated kaolin clay particles which can be corporated into polyester resins. The coating on the clay can be an amino amide formed from fatty acids and mixtures of polyethylene amines. The coated clay is formed by preparing a hydrosol containing a clay, adding some phosphoric acid, adding the specified amino acid and drying it at a temperature which is as high as 1400°F. The product is then screened to remove the larger particles. U.S. Pat. No. 3,354,111 discloses a pigment dispersion which is a suspension of a pigment dispersed with an amide. The reminder of the dispersion is an organic solvent. The amide is an N,N-dialkylamide. Those dispersions containing the organic solvent can be used for the production of shaped articles such as plastic sheeting of synthetic linear polymers. U.S. Pat. No. 2,234,164 discloses leafable metal pigment flakes dispersed in an alkaline organic amino compound, e.g., dimethyl amine, and a higher fatty acid, forming neutral or basic salts. The result is a paste. The dispersion or paste can contain a hydrocarbon thinner. The method involves mixing, heating to solution form and coating to a paste. The pigment pastes are used in paint lacquer, varnish and in other types of protective coating. U.S. Pat. No. 3,197,425 discloses the admixing a resin with a mixture of a pigment lubricated by an acid amide. The latter mixture is obtained by first admixing and by then milling the pigment and amide before being placed in the admixture. The acid amide is a condensation product of alkanolamines and fatty acids. The admixture is used for the coloring of plastic resins material such as thermoplastic polyethylene. The coloring composition is admixed with the plastic resin and the sheets are normally formed by comilling them in a coplex machine and then spraying them in an extruder to form the sheets.

BROAD DESCRIPTION OF THE INVENTION

This invention encompasses fatty acid amide coated pigments which are in particle form. The fatty acid amide encapsulates one or more individual pigment particles. The product is in a particle form, that is, granule or pellet, and is not in a powder form. When the coated pigments are formulated with thermoplastic resins, thermoset resins and combinations thereof, a high degree of dispersion is obtained. The high degree of dispersion is produced by mixing the pigment with the fatty acid amide while the latter is in a melt stage, with the introduction of low shear agitation, to form a homogeneous mixture. Due to the superior wetting action of the fatty acid amide, an extremely fine dispersion is formed in which the aggregates are easily separated to a colloidal type suspension. The fatty acid amide is then allowed to surround each individual crystal. Upon cooling, resolidification occurs, with the fatty acid amide encapsulating the pigment crystals and preventing them from reagglomerating.

This invention also includes a formed composition which is a thermoplastic material whih contains the pigments coated with the fatty acid amides. The thermoplastic material preferably has been compressed into sheets. Generally, high molecular weight polymers are poor wetting vehicles for pigments. The melt viscosity of high molecular weight polymers does not provide a suitable media to separate the pigment aggregates without the introduction of high shear. The presence of aggregates are the major cause of specking, streaking, poor opacity, degradation of polymer physicals, and limitations of pigment concentrations. Applicant produces pigment dispersions (fatty acid amide coated pigments) which are essentially free of pigment aggregates at uniquely high pigment concentrations. Satisfactorily pigmented compounds are produced by mixing applicant's dispersions with a suitable amount of uncolored polymer in low shear compounding equipment, etc. By the use of applicant's dispersions brilliant reflected hues, increased opacity of opaque pigments, increased transparency of transparent pigments, and increased pigment concentrations of the polymer are obtained. In the formed thermoplastic compositions, applicant's coated pigments readily wet out which is one of the reasons the important advantages of this invention are achieved. Applicant is able to fully develop the color of the pigments.

Applicant, using any form of the pigment composition of this invention, can achieve pigment loadings of 5 to 90 percent by weight when inorganic pigments are used and from 5 to 75 percent by weight when organic pigments are used.

This invention further encompasses a liquid admixture (usually a paste) containing a non-solvent diluent and pigment particles which are encapsulated by a fatty acid amide. The preferred pastes can be formulated with thermoplastics, thermosets and combinations thereof. The pigments are highly dispersed or in an unagglomerated state in the resin.

This invention includes a liquid admixture (usually a paste) of a fatty acid amide which is liquid at room temperature and pigment particles. The preferred fatty acid amide is formamide. The admixture can be formulated with a thermoplastic, a thermoset or combination thereof. The pigment particles are in an unagglomerated state in the resin.

This invention involves what is termed the cold casting process. In that process, melted fatty acid amide and pigment particles are admixed. The resultant fluid (creamy mass) is cooled so that the fluid solidifies, the fatty acid amide encapsulating the pigment particles. The cooling can be done by placing the resultant fluid in molds. The cooling is usually done by allowing the resultant fluid to cool to about room temperature. The solidified material is then particulated, e.g., by grinding, and sized, e.g., by screening, to remove the fines. The resultant thermoplastic material has all of the advantages discussed above. The resultant coated pigment particles are then formulated with uncolored thermoplastic material by means, such as, an injection molder. The resultant formed colored thermoplastic material has all of the improved properties discussed above.

This invention also involves what is termed the cold roller process. In that process, melted fatty acid amide and pigment particles are admixed. The resultant fluid (creamy mass) is passed through a heated low shear mixer, preferably a continuous one, such as, a heated extruder, a Kneadmaster or some other turn screw heated mixer. The creamy mass must be kept at a temperature at or above the melting point of the fatty acid amide. The creamy mass is then solidified and formed by passing the creamy mass through cold and forming rollers. The cooling is usually done using rollers having a surface temperature of minus 10°C. Wafer-like flakes or material are produced. It is extremely easy to handle, which is a very important advantage. The solidified wafer-like material is then particulated, e.g., by grinding, and sized, e.g., by screening to remove the fines. The resultant thermoplastic material has all of the advantages discussed above. The resultant coated pigment particles are then formulated with uncolored thermoplastic material in means such as an injection molder. The resultant formed colored thermoplastic material has all of the improved properties discussed above. The cold roller process is preferred and is an improvement over the cold casting process.

The above are solvent-free processes, so the system does not need a drying step. Low shear processing steps can be used. By putting the pigment in a matrix, in an unagglemerated form, its color is developed to a greater degree. There does not appear to be any reaction of the fatty acid amide with the pigment. The fatty acid amide slides the pigment through the plastic when it is compounded with the thermoplastic material, so the pigment easily disperses in the thermoplastic material. Higher pigment loadings are obtained, as the bulk volume of the coated pigments is about one half of that of known pigments.

This invention involves a process of preparing coated pigment particles in a liquid or paste form for compounding with thermoplastics, thermosets and combinations thereof. The invention involves preparing a heated admixture of a molten fatty acid amide, pigment particles and a non-solvent diluent, and cooling the admixture, a paste resulting. Preferably the diluent is mineral oil. The resultant liquid is compounded with thermoplastics, thermosets and combinations thereof, the compounding step not utilizing any solvent.

This invention involves a process of preparing a fluid admixture of a melted fatty acid amide and pigment particles, adding a non-solvent diluent to the fluid admixture and cooling the admixture, a paste or liquid resulting. Preferably the admixture is cooled to about room temperature. The preferred non-solvent diluent is mineral oil. The resultant liquid is compounded with thermoplastics, thermosets and combinations thereof, the compounding step not utilizing any solvent.

This invention involves a process of admixing pigment particles and a non-solvent diluent, heating the admixture to a temperature at which a fatty acid amide is in the molten state, admixing the fatty acid amide with the heated admixture, and cooling the admixture, a paste or liquid resulting. Preferably the admixture is cooled to about room temperature. The preferred diluent is mineral oil. The resultant liquid is compounded with thermoplastics, thermosets and combinations thereof, the compounding step not utilizing any solvent.

The invention also involves admixing a non-solvent diluent with pigment particles which are encapsulated by a fatty acid amide, a liquid or a paste forming. Preferably the admixing is done at about room temperature. Preferably the diluent is mineral oil. A variation of this process involves heating a non-solvent diluent to a temperature below that at which a fatty acid amide is in the molten state, admixing the heated non-solvent diluent with pigment particles which are encapsulated by the fatty acid amide and cooling the admixture, a liquid or a paste forming. Preferably the admixture is cooled to about room temperature. The resultant liquid is compounded with thermoplastics, thermosets and combinations thereof.

This invention still further involves a process of preparing coated pigment particles for dry compounding with thermoplastics thermosets or combinations thereof. The process includes preparing a liquid or paste admixture of a fatty acid amide which is liquid at room temperature and pigment particles. The preferred fatty acid amide is formamide. The coated pigment particles are compounded with a thermoplastic, a thermoset or combination thereof into a shaped item, this step not utilizing any solvent. The compounding can be achieved by means of a screw injection molding machine.

Fatty acid coated pigment compositions can be formulated from pigment particles, a liquid non-solvent diluent and a liquid fatty acid.

DETAILED DESCRIPTION OF THE INVENTION

Fatty acid amides formed by condensation methods are well known in the art. The nitrogen atoms of primary or secondary amides are termed "amidizable nitrogen atoms" or "non-tertiary amines". The term non-tertiary amine means that only primary and secondary amines are encompassed by the term. When amines are condensed with fatty acids, fatty acid amides usually form; however ester may also develop in greater or lesser quantity. If the amines or alkylolamines used for the condensation contain two amidizable nitrogen atoms or one amidizable nitrogen atom and one hydroxyl group, the products of the process can also contain a plurality of fatty acid radicals bounded amidoidally and/or esteroidally in the molecule. This invention is mainly concerned with the amide linkage because it is the most effective molecular site for the dispersion of pigments. Molecules (entities) containing the mixed ester and amide linkages are less reactive. The amide linkage is predominately formed first because amines are much more reactive than hydroxyl groups, and also the manufacturing technique is usually through a melt polymerization of the acid-salt precursor to the Nylon 6/6 reaction. This invention is generally restricted to condensation products which contain amide linkages, or amide and ester linkages. Each molecule (entity) can contain a multiple of the amide and ester linkages, or a multiple of either. Some of the molecules need not contain amide linkages but only less than 20 percent of the molecules (entities) can contain only ester linkages (and preferably none of the molecules contain only ester linkages). The term a fatty acid amide, as used herein, encompasses the above, including the restrictions placed on the presence of the ester linkages.

(The above generally applies to the fully or substantially amidized fatty acid which are solid or liquid at room temperature. amine amidized fatty acids that are liquid at room temperature will contain fewer amide linkages. The latter must contain at least 30 percent of the possible amide linkages to be useful within this invention and preferably at least 50 percent of the possible amide linkages, but few enough amide and other linkages to keep the partially amidized fatty acid liquid at room temperature.)

Typical subgeneric classes of useful amines are alkymonoamines, alkyldiamines, alkyltriamines, arylmonoamines, aryldiamines, cyclicalkylmonoamines, arylalkanolamines, and alkyalkanolamines; or terms such as aliphatic amines, cyclic amines and heterocyclic amines, primary alkyl amines, secondary alkyl amines, resin amines and polyamines, can be used for useful classes of amines. Branches and straight chain amines can be used. Mixtures of amines can be used. (Resin amines are derived from wood and gum resins.)

The amines used in preparing the fatty acid amides can be polyamines. Examples of useful polyamines are ethylene diamine, butylene diamine, hexylene diamine, propylene diamine, tetraethylene diamine, triethylene tetramine, octa methylene diamine, and tetraethylene pentamine. The diamines and triamines are preferred, the most preferred amine being ethylene diamine.

Useful primary alkyl amines have from one to 36 carbon atoms, examples of which are: methyl amine, ethyl amine, n-propylamine i-propyl amine, butyl amine, amyl amine, hexyl amine, hexadecyl amine, octadecyl amine, dodecyl amine, tridecyl amine, tetradecyl amine, pentadecyl amine, hexadecyl amine, heptadecyl amine, octadecyl amine, decyl amine, and eicosyl amine. Useful secondary alkyl amines include di-(dodecyl) amine, di-(tridecyl) amine, di-(tetradecyl) amine, di-(pentadecyl) amine, di-(hexadecyl) amine, di-(heptadecyl) amine, di-(octadecyl) amine, di-(nonadecyl) amine, di-(eicosyl) amine, N-propyl-dodecyl amine, N-butyl dodecyl amine, N-amyl-dodecylamine, N-butyl-tridecyl amine, and N-amyl-tridecyl amine.

Useful alkyol amines are hydroxy ethyl amine, i-hydroxypropyl amine, n-hydroxypropyl amine and dihydroxypropyl amine. Alkylol amines having up to 3 hydroxyl groups are suited to the practice of this invention. It is preferred to use monohydric alkylol amines when alkylol amines are used. In the amines, if two radicals are linked to one nitrogen atom, the radicals can be the same or different for instance, one being an alkyl and one an alkylol radical or two alkyl groups of different chain length.

Examples of useful heterocyclic amines are the heterocyclic amines such as alkyl imidazolines and oxazolines. Examples of useful long chain amines are dodecyl diglycerol amine, and dodecyl methylglucamine.

Poly(fatty acid amides) derived from polymeric fatty acids and polyamines can be used. Such poly(fatty acid amides) normally have molecular weights of 3,000 to 10,000. Examples of poly(fatty acid amides) are those formed from ethylene diamine and polymerized linoleic acid and from diethylene triamine and polymerized oleic acid. Useful N-alkyl polyamines can be: N-alkyl-1,3-diaminopropanes, such as, N-dodecyl-1,3-diaminopropane, N-tridecyl-1,3-diaminopropane, N-tetradecyl-1,3-diaminopropane, N-pentadecyl-1,3-diaminopropane, N-hexadecyl-1,3-diaminopropane, N-heptadecyl-1,3-diaminopropane, N-octadecyl-1,3-diaminopropane, N-nonadecyl-1,3-diaminopropane and N-eicosyl-1,3-diaminopropane; N-alkyl-ethylene diamines; N-alkyl-1,3-diaminobutanes; N-alkyl-1,4-diaminobutanes; N-alkyl-1,3-diaminopentanes; N-alkyl-1,4-diaminopentanes; N-alkyl-5,5-diaminopentanes; N-alkyl-1,4-diaminohexanes; N-alkyl-1,5-diaminohexanes; and N-alkyl-1,6-diaminohexanes. N,N'-dialkylpolyamines are also useful.

The preferred amine compounds are saturated, i.e., do not contain double bonds in the chain. However, unsaturated compounds may be employed and include such compounds as dodecylenic amine, didodecylenic amine, N-dodecylenic ethylene diamine, N-dodecylenic-1,3-diaminopropane, oleic amine, dioleic amine, N-oleic ethylene diamine, N-oleic-1,3-diaminopropane, linoleic amine, dilinoleic amine, N-linoleic ethylene diamine, N-linoleic-1,3-diaminopropane.

The amine radical in the fatty acid amide preferably have from zero to 36 carbon atoms.

Natural or synthetic fatty acids can be used to form the fatty acid amide. Mixtures of fatty acids can be used.

Useful fatty acids may be saturated or unsaturated. The saturated fatty acids are represented by the general formula: RCOOH, where R can be H or an alkyl group, branched or straight chain. Examples of saturated fatty acids are formic acid, acetic acid, propionic acid, n-butyric acid, isobutyric acid, N-valeric acid, n-caproic acid, n-heptoic acid, caprylic acid, n-nonylic acid, capric acid, undecylic acid, lauric acid, tridecylic acid, myristic acid, pentadecylic acid, palmitic acid, margaric acid, stearic acid, arachidic acid and behenic acid. Examples of unsaturated fatty acids are oleic acid, linoleic acid, linolenic acid, licanic acid, eleostearic acid, ricinoleic acid, clupanodonic acid and palmitoleic acid. The unsaturated fatty acids can be those containing one double bond, e.g., oleic acid, two double bonds, e.g., linoleic acid, and three double bonds, e.g., eleostearic acid, etc.

Useful fatty acids which contain one or more hydroxyl groups in the acyl group of the fatty acid are, e.g., dihydroxystearic acid. Useful hydrogenated fatty acids are tallow fatty acids, castor oil fatty acids, rape oil fatty acids, peanut oil fatty acids and fish oil fatty acids. Polymeric fatty acids can be used. Polymeric fatty acids can be condensed with polyamines as described in U.S. Pat. Nos. 2,450,940 and 3,328,185.

The fatty acid radicals in the fatty acid amides preferably contain from 1 to 36 carbon atoms.

Admixtures of the fatty acid amides can be used.

Most fatty acid amides are solids at room temperature. Some fatty acid amides, such as, formamide, are liquid at room temperature.

As used herein, the phrase "fatty acid amide which is liquid at room temperature" includes partially amidized fatty acids, i.e., fatty acids which have only been partially converted to fatty acid amides. Examples of such partially amidized fatty acids are partially amidized isobutyric acid, partially amidized n-valeric acid, partially amidized n-caproic acid, partially amidized n-heptoic acid, partially amidized coprylic acid, partially amidized n-nonylic acid, partially amidized acetic acid, partially amidized propionic acid, partially amidized n-butyric acid, partially amidized ricinoleic acid, partially amidized oleic acid, partially amidized linoleic acid, and partially amidized linoleic acid. Examples of such partially amidized fatty acids are the partially amidized vegetable oils containing fatty acids, such as, partially amidized castor oil (fatty acids), partially amidized olive oil (fatty acids), partially amidized peanut oil (fatty acids), partially amidized rape oil (fatty acids), partially amidized corn oil (fatty acids), partially amidized cottonseed oil (fatty acids), partially amidized soybean oil (fatty acids), partially amidized linseed oil (fatty acids), partially amidized tung oil (fatty acids), and partially amidized oiticia oil (fatty acids). Examples of such partially amidized fatty acids are the partially amidized animal oils containing fatty acids such as partially amidized lard oil (fatty acids), partially amidized neat's foot oil (fatty acids), partially amidized whale oil (fatty acids) and partially amidized fish oil (fatty acids). Examples of such partially amidized fatty acids are the partially amidized glycerides of fatty acids such as linoleic acid, recinoleic acid, linolenic acid and oleic acid. Admixtures of the liquid fatty acids amides can be used. The fatty acids can be amidized to such an extent that they are liquid at room temperature. They must be liquid enough or enough used thereof to assure that the resultant admixture is a liquid or a paste once the pigment particles have been added. The more fully amidized the more fully developed (lack of pigment agglomerates, etc). will be the pigment when compounded with a resin.

Any suitable non-solvent diluent can be used. The preferred non-solvent diluent is mineral oil. Examples of useful diluents are liquid fatty acid esters, liquid polyesters, liquid vegetable oils, liquid animal oils, liquid petroleum lubricating oil, liquid glycols and liquid trihydric alcohols. The suitable nonsolvent diluent must be liquid at the temperature of use; it is preferably liquid at room temperature.

Examples of useful diluents which are liquid wetting agents are the liquid anionic wetting agents such as the liquid sodium salts of alcohol sulfates (e.g., Duponal 80, Duponal WN, Dupanol WAQ, Dupanol WAQE, Duponal L-144 WDG, Duponal D, Duponal LS and Duponal RA), the liquid amine sets of alcohol sulfates (e.g., Duponal AM, Duponal G and Duponal ST), the liquid alcohol phosphates (e.g., Zelec NE and Zelec NK), the liquid aliphatic sulfonates (e.g., Petrowet R, Alkanol 189-S, Aritone T and Alkonal F), the liquid alkylarly sulfonates (e.g., Alkanol B, G, Alkanol WXN, Neomerpin N, Alkanol DW and Merpentine), the liquid nonionic wetting agents such as the liquid alcohol/ethylene oxide adducts (e.g., Merpol SE, Merpol OE, Merpol SH, Merpol OJ, Merpol OJS, Merpol OP, Merpol HC and Merpol HCS) and ones such as Zonyl A, and the liquid amphoteric wetting agents such as the liquid alkyl betaines (C type) (e.g., Product BDO and Product BCO) and the liquid alkyl betaines (N type) (e.g., Product DDN, Product HDN and Merpol ON). Other useful diluents which are liquid nonionic agents are Igepal CA 420, Igepal Ca 520, Igepal CA 630, and Igepal CA 620.

Examples of animal and vegetable oil diluents are castor oil, olive oil, peanut oil, rape oil, corn oil, cottonseed oil, soybean oil, linseed oil, tung oil, oiticica oil, lard oil, neat's foot oil, whale oil and fish oil.

Examples of liquid glycols diluents are ethylene glycol, propylene glycol and 1,3-butylene glycol. An example of a useful liquid trihydric alcohol is glycerol. Examples of useful fatty acid esters are ethyl formate, ethyl caprylate, ethyl propionate, ethyl butyrate, propyl acetate, butyl acetate, butyl formate, and methyl butyrate.

Admixtures of the liquid non-solvent diluents can be used.

Preferably up to 50 percent by weight of the non-solvent diluent is used and most preferably 10 to 25 percent by weight of the non-solvent diluent is used. Preferably the diluent does not have a tendency to foam, or has a low tendency to foam.

The term pigment means substances which are generally considered insoluble in the vehicle, and pigments generally have the property of light refractivity. (Dyes are considered soluble and generally have only the property of light absorption.) Phosphorescent, luminescent, fluorescent, metalescent, and pearlescent materials fit within the term pigment, as used herein and in the art. The pigment must be in particle form and should have a mean particle size between about 0.1 and about 100 microns and preferably between about 0.2 and about 50 microns. The most preferred mean particle size for organic pigments is about 0.2 microns. The most preferred particle size for inorganic pigments is about 50 microns.

Examples of organic and inorganic pigments which can be used in this invention are iron blue zinc oxide, titanium dioxide, chrome yellow, carbon black, chrome orange, chrome green, zinc chromate, red lead, lethol red, the lakes, azo type toners, phthalocyanines, aluminum hydrates, lakes, iron oxide, white lead, extenders, phosphotungstic acid toners, titanium-containing pigments, sulfur-containing pigments, extenders, calcium carbonate, aluminum oxide, lithopane, ultraphone, lead chromate, cadmium sulfide, cadmium selenide, barium sulfate, azo pigments, anthraquinone and vat pigments, phthalocyanine pigments, acrylamino yellow, magnesium oxide, chrome red, antimony oxide, zinc sulfide, magnesium fluoride and ground barytes. Benzoid pigments are useful and examples are toners and lakes. Examples of benzoid toners are yellow toners, e.g., benzoid yellows and Hansa yellows; orange toners, e.g., vat orange 3; red toners, e.g., napthol reds; violet toners; blue toners; green toners; brown toners; and black toners. Examples of benzoid lakes are yellow lakes, e.g., acid yellow 2; orange lakes; red lakes; violet lakes; blue lakes; e.g., acid blue 93; green lakes; brown lakes; and black lakes, e.g., natural black 3. Metallic pigments can be used, and examples are aluminum flakes. Mixtures of pigments can be used.

When the cold casting embodiment is used, the fatty acid amide is placed in a container, e.g., admixer or blender, and heated to or above its melting point. The pigment particles are added to the melted fatty acid amide and admixed. A creamy-appearing mass is obtained. Alternatively, the fatty acid amide can be melted and then placed in the admixer, which may or may not already contain the pigment. The melted fatty acid amide can be added at the same time that the pigment is added. The pigment and the fatty amide can be placed in the admixer, and then the amide melted. Any other combination is within the scope of this invention, including adding each or both a little at a time to the admixer. Agitation or some other admixing is necessary to assure good admixing or blending.

The creamy mass is then cooled so that it solidifies by either allowing it to return to, say, about room temperature, or by subjecting it to some form of cooling, such as, refrigeration. Cooling is normally done to about room temperature, but higher and lower temperatures can be used. Preferably the creamy mass is poured into molds, say about 1 ft. by 1 ft. and 2 inches deep, and then cooled. The solidified mass is then particulated by grinding by any suitable means. Knife type grinders are preferred. It may first be necessary to pulverize the solidified mass. The coated pigment mass is normally ground to a material having a mean particle size of about two-sixteenths to three-sixteenths inch. The material is then treated preferably by screening, so that the fine particles and dusts are removed by passage through a one-sixeenth inch screen. The grinding and screening can be done in a hopper arrangement which feeds the remaining coated pigment particles into an injection molder along with the thermoplastic or thermoset material.

When the cold roller embodiment is used, the fatty acid amide is placed in a container, e.g., admixer or blender, and melted by and heated to or above its melting point. The pigment particles are added to the melted fatty acid amide and admixed. Agitation or some other admixing is necessary to assure good admixing or blending. Low shear agitation is preferred. A creamy-appearing mass is obtained As discussed above under the cold casting embodiment, alternative methods of bringing the melted fatty acid amide and pigment together are within the scope of this invention. The admixture is passed through an extruder, preferably a heated extruder. The material is preferably extruded through a vented extruder with a compounding screw. The vent is desirable to eliminate any entrapped air.

The creamy mass is then passed through cooled forming rollers. The cooled rollers should have a surface temperature of room temperature or less, and preferably below 0°C. and even more preferably about minus 10°C. The creamy mass is solidified in this manner. Cooling is normally done to about room temperature but higher and lower temperatures are satisfactory. The operation of the cooled rollers is conventional and within the skill of those ordinarily skilled in the art. Preferably two rollers are used, although a group of cooling rollers and a group of forming rollers is very advantageous. The rolls (rollers) should be urged toward each other so as to provide a pressure of not less than 25 lbs. per linear inch and preferably of not less than 100 lbs. per linear inch. The rolls may be made of any suitable material such as wood, stone, plastic material, ceramic material or the like, or rolls faced with such material; the rolls are usually made of metal as it is cheaper and easier to fabricate. The rolls are usually made of a hard material, iron or steel being suitable. The rollers usually have a 5 to 20 thousandths of an inch clearance, preferably about 10 thousandths of an inch clearance. The material coming out of the rollers is a semi-continuous sheet, i.e., solid wafer-like flakes. Those flakes are then particulated by grinding or by any other suitable means. Knife type grinders are preferred. It may first be necessary to pulverize the solidified mass. The coated pigment mass is normally ground to a material having a mean particle size of about three-sixteenths inch. The material is then treated, preferably by screening, so that the fine particles and dusts are removed. The remaining material is further treated, preferably by passage through 1 1/16 inch screen, to remove the very large particles. The grinding and screening can be done in a hopper arrangement which feeds the remaining coated pigment particles into an injection molder along with the thermoplastic material. No solvent should be used in either embodiment when the fatty acid amide and the pigments are admixed and further processed. The coated pigment must be in a dry form when it is finally cooled, and when it is formulated with the thermoplastic or thermoset material.

Any thermoplastic material can be formulated with the coated pigments (including paste formulations) of this invention.

Examples of thermoplastics with which the pigment dispersions can be used are: the ABS resins prepared from acrylonitrile, butadiene and styrene; blends of ABC resins with other thermoplastics, such as, polyvinylchloride; resins prepared from acrylonitrile, butadiene, styrene and alpha methyl styrene; resins prepared from butadiene, styrene and methacrylic acid; resins prepared from acrylonitrile, butadiene, styrene and methyl methacrylate acetal copolymers; acetal resins; acrylic resins and modified acrylic resins, such as, polymethyl methacrylate, copolymers of styrene and methyl methacrylate, copolymers of methyl methacrylate and alpha methyl styrene; the cellulosic plastics, such as, cellulose acetate plastics, cellulose acetate butyrate plastics, cellulose propionate plastics, ethyl cellulose plastics and cellulose nitrate plastics; mixtures of ethyl cellulose plastics and cellulose acetate butyrate; chlorinated polyether; the fluoroplastics; such as, polytetrafluoroethylene, polyvinylidene fluoride, the fluorinated ethylene-propylene plastics and the chlorotrifluoroethylene plastics; the phenoxy resins; the polybutadiene-type resins, such as, butadiene-styrene copolymer and polybutadiene; the polycarbonates; the polyethylene resins, such as, low-density polyethylene; copolymers of polyethylene with other materials; chlorinated polyethylenes; chlorosulfonated polyethylenes; ethylene vinyl acetate copolymers; ethylene acrylate copolymer; polyphenylene oxide; the polypropylenes; the polysulfones, the polystyrenes; styrene copolymers, such as, styrene-methyl methacrylate copolymer; and vinyl polymers and copolymers, such as, polyvinyl chloride, copolymer of vinyl chloride and vinyl acetate, copolymer of vinyl chloride, vinyl acetate and vinyl alcohol, copolymer of vinyl chloride and vinylidene chloride, and polyvinyldichloride.

Any thermoset material can be formulated with the coated pigments (including paste formulations) of this invention.

Examples of thermosets with which the pigment dispersions can be used are: alkyl resins (allylics) such as, homopolymers of diallyl phthalate, diallyl isophthalate, diallyl maleate, diallyl chlorendate, diethylene glycol bis (allyl carbonate) and triallyl cyanurate and copolymers of diallyl phthalate and polyesters; amino resins, such as, urea-formaldehyde resins, melamineformaldehyde resins, acrylamide resins, analine resins, benzoquanamine resins, dicyanodiamide resins, ethyleneurea resins, thiourea resins, toluenesulfonamide resins, triazine resins produced from urea, formaldehyde and a primary amine and di- and tri- methylol melamine resins; epoxy resins, such as, glycidyl ether resins prepared by the reaction of a chlorohydrin with a phenolic or alcoholic compound, acid epoxide resins prepared by the oxidation of olefins with peracetic acid, or more specifically, resins made from epichlorohydrin and bisphenol A, resins made from epichlorohydrin and halogenated bisphenols such as chlorinated and brominated bisphenols, resins made from epichlorohydrin and phenol formaldehyde condensates, resins made from epichlorohydrin and polyglycols or other aliphatic compounds and resins made from epichlorohydrin and phenol, cresol, other substituted phenols or aliphatic alcohols; furane resins, such as, resins derived from furfuryl alcohol and resins derived from furfuryl alcohol and formaldehyde or furfurylaldehyde, polybutadiene-type resins, such as, polybutadienes and butadiene-styrene resins; fully cross-linked polyethylene (can be self cross-linkages between the molecules themselves or cross-linkages using in part carbon black); unsaturated polyesters, such as, unsaturated polyesters derived from maleic anhydric phthalic anhydride, propylene glycol and styrene, unsaturated polyesters derived from isophthalic acid, maleic anhydride, propylene glycol and styrene, and unsaturated polyesters derived from isophthalic acid, maleic anhydride, styrene and diethylene glycol; unsaturated polyesters obtained from unsaturated dibasic acids such as fumaric acid or maleic anhydride, optionally saturated dibasic acids, such as, phthalic anhydride, isophthalic acid, tetrahydrophthalic anhydride, adipic acid, sebacic acid, azelaic acid, digylcolic acid, tetrabromophthalic anhydride, chlorendic acid, chlorendic anhydride, or tetrachlophthalic chloride, and glycols such as propylene glycol, ethylene glycol, diethylene glycol, dipropylene glycol, triethylene glycol, tripropylene glycol, 1,3-butylene glycol, neopentylene glycol, 2,2,4-trimethyl-1,3-pentanediol, 1,3-propanediol, 2-ethyl-1,3-hexanediol, 2-ethyl-2-butyl-1,3-propanediol, 2-methyl-2-ethyl-1,3-propanediol, 1,6-hexanediol or 1,5-pentanediol, such unsaturated polyesters being completely or partially cross-linked by vinyl monomers such as styrene, methyl methacrylate, chlorostyrene, vinyl toluene, triallycyanurate, and diallyl phthalate or diallyl isophthalate; and alkyds (unsaturated polyesters compounded with low volatility monomers).

Combinations of thermosets and thermoplastics can be formulated with the coated pigments of this invention.

Reinforced thermoplastics and thermosets can be used. The reinforcing is normally done with glass fibers, fibrous asbestos, metal fibers, refractory fibers, and other fibers.

Various fillers can be used in the thermoplastics and thermosets. Examples of the fillers are calcium carbonate, carbon black, non-pigment clay, asbestos, mica, talc, barium sulfate, magnesium oxide, barium carbonate, ground glass, and metal powders. It is noted that several of the fillers are also listed as useful pigments. A material can be used as a pigment and a filler, but when it is used as a pigment it must have been treated with the fatty acid amide.

The thermoplastics and thermosets can contain other conventional materials, such as, plasticizers, stabilizers, flame retardants, UV absorbers, antistatic additives, etc.

The coated pigment can contain from about 10 to about 90 percent by weight of pigment and from about 90 to about 10 percent by weight of fatty acid amide, although the preferred amount of pigment is 30 to 75 percent by weight and the preferred amount of fatty acid amide is 70 to 75 percent by weight. Between about 0.1 and about 10 parts by weight of the coated pigment can be formulated with 100 parts by weight of thermoplastic or thermoset although the preferred amount of coated pigment is 0.5 to 3.0 parts by weight per 100 parts by weight of the thermoplastic or thermoset.

The coated pigments include an individual particle encased in, the vehicle or several individual particles encased in the vehicle but there is no agglomeration of the particles in the vehicle, but, there is no agglomeration of the particles in the vehicle. This allows better physical properties than previously attained in the prior art. (During the setting and cooling, the fatty acid amide or "vehicle" encases each pigment particle and then the fatty acid amide solidified around the pigment particles. If the pigment is not micro-pulverized there is a distinct possibility of agglomerated pigments being encapsulated, however the concept in this invention is that one or more unagglomerated particles are bound to make up a particle, say of about three-sixteenths of an inch). There is development of essentially the full color potential of the pigments. This is achieved through the superior wetting action of the fatty acid vehicle. Also, extremely high pigment loadings are possible with the coated pigments, for example, 100 parts of coated pigment to one part of resin. Typical pigment concentrations presently being prepared by the coloring industry range between 5 and 50 percent by weight pigment. This is the most pigment which can be practically compounded into a vehicle by the prior art methods and pigments. The use of applicant's coated pigment can attain a pigment level up to ninety percent by weight. This high level is unique within the industry. One reason that it is possible is to reduce the bulk density of the applicant's coated pigment to about one-half of the bulk density of the prior art pigment formulation.

The dry coated pigments are dustless, which is extremely important in a commercial sense. The dry coated pigment are not drawn together by standing or due to vibration, the latter is very important when automated coloring systems are used.

The dry coated pigment particles (after being sized) or liquid pigment compositions are formulated and formed with uncolored thermoplastic or thermoset material particles in or by some lowshear compounding means, such as, an injection molder, rotational casting means, blow molding machinery, extruder, Banbury-type mechanical mixer and compounding rolls. (High shear compounding means can be used, but is not necessary or preferred.) The final product can have any shape, such as, film, sheet, rod filament, cubical, spherical, etc. The final product can even be foamed. Thus the coloring (dry or liquid) of formed thermoplastic or thermoset materials is achieved without the use of high sheer as is necessary in the prior art method and with prior art pigments.

The liquid pigment compositions have the added advantages of being in a flowable or paste state, which makes for ease of handling and compounding with resins in many instances.

As used herein, the term liquid includes a paste, etc.

In this invention, lubricants can be added, but are not needed, to the materials (encapsulated pigment and resin material) to be molded. Examples of suitable lubricants are mixtures of soaps of aluminum, chromium, zinc, calcium, magnesium barium and/or zirconium, lanolin, linseed oil, mineral oil, neat's foot oil, paraffin, waxes (beeswax), castor oil, graphite, metallic oleates, metallic stearates, and metallic palmitates. The lubricants are general oils, waxes, and higher fatty acid salts.

The following specific examples illustrate this invention, but the invention is not limited to the specific examples.

EXAMPLE 1

50 grams of hydroxystearic acid ethylenediamide were placed in a resin kettle and melted at 200°C. The amide was gently agitated. 150 grams of cadmium sulfide yellow was slowly added to the melted amide and a thick creamy paste was obtained. The paste was then passed through a pair of cold rollers which had a nip distance of 0.01 inch and had surface temperatures of $-10°C$. The paste was solidified (it was cooled to room temperature by passing it through the cold rollers) and was in semicontinuous form. The solidified sheets were ground into wafer-like fragments which had average dimensions of three-sixteenths inch by 0.010 inch. The grinding operation delivered a product which was screened to eliminate any traces of dust as well as very tiny, uncommercially acceptable, fragmentary particles. The product was thin comprised of wafer-like particles which had a length of about three-sixteenths of an inch. The bulk volume of the treated pigment was about one-half that of an equal weight of the untreated pigment. The fragments were compounded in a screw injection molding machine with enough polypropylene particles to prepare a formulation having 10 parts of the pigment to 100 parts of the polypropylene. A 1 mil thick film was prepared by passing the formulation through a compression press. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 2

Example 1 was repeated except that the nip distance of the cooled rollers was 0.005 inch. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 3

Example 1 was repeated except that 200 grams of mercury cadmium sulfide red was used instead of the cadmium sulfide yellow. When the film was view through a microscope, no aggegates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 4

Example 1 was repeated except that 285 grams of titanium dioxide was used instead of the cadmium sulfide yellow. When the film was viewed through a microscope, no aggregates were visible. Spectrophotometric analysis showed a higher peak of reflectance than conventinally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 5

Example 1 was repeated except that 285 grams of black iron oxide was used instead of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 6

Example 1 was repeated except that 117 grams of ultramarine blue was used instead of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 7

Example 1 was repeated except that 50 grams of hydroxystearic acid monoethanolamide was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 8

Example 1 was repeated except that 50 grams of hydroxystearic acid monoethanolamide was used instead of the hydroxystearic acid ethylenediamide and that 200 grams of mercury cadmium sulfide red was used instead of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 9

Example 1 was repeated except that 50 grams of hydroxystearic acid monoethanolamide was used instead of the hydroxystearic acid ethylenediamide and that 285 grams of titanium dioxide was used instead of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 10

Example 1 was repeated except that 50 grams of hydroxystearic acid monoethanolamide was used in place of the hydroxystearic acid ethylenediamide and that 285 grams of black iron oxide was used in place of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 11

Example 1 was repeated except that 50 grams of hydroxystearic acid monoethanolamide was used instead of the hydroxystearic acid ethylenediamide and that 117 grams of ultramarine blue was used in place of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 12

Example 1 was repeated except that 50 grams of ricinoleic acid ethylenediamide was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in piror art pigmented thermoplastics. Much higher than prior art pigment loading in the thermoplastic was achieved.

EXAMPLE 13

Example 1 was repeated except that 50 grams of ricinoleic acid ethylenediamide was used instead of the hydroxystearic acid ethylenediamide and that 200 grams of mercury cadmium sulfide red was used in place of the cadmium sulfide yellow. When the film was viewed through a microscope, no aggregates were visible. Spectrophotometric analaysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 14

Example 1 was repeated except that 50 grams of ricinoleic acid ethylenediamide was used instead of the hydroxystearic acid ethyleneamide and that 285 grams of titanium dioxide was used in place of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 15

Example 1 was repeated except that 50 grams of ricinoleic acid ethylenediamide was used in place of the hydroxystearic acid ethylenediamide and that 285 grams of black iron oxide was used in place of the cadmium sulfide yellow. When the film was viewed through a microscope, no aggregates were visible. Spectrophotometric analysis showed a higher peak of reflectance than conventionally prepared disperions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 16

Example 1 was repeated except that 50 grams of ricinoleic acid ethylenediamide was used in place of the hydroxystearic acid ethylenediamide and that 117 grams of ultramarine blue was used in place of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 17

Example 1 was repeated except that 50 grams of ricinoleic acid monoethanolamide was used in place of the hydroxystearic acid ethylenediamide. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 18

Example 1 was repeated except that the polypropylene was replaced with an equal amount of an ABS resin prepared from acrylonitrite, butadiene and styrene. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 19

Example 1 was repeated except that the polypropylene was replaced with an equal amount of polymethyl methacrylate. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 20

Example 1 was repeated except that the polypropylene was replaced with an equal amount of a copolymer of styrene and methyl methacrylate. When the film was viewed through a microscope, no aggregates were visible. Spectrophotometric analysis showed a higher peak of reflectance than conventionally prepared dispersion. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 21

Example 1 was repeated except that the polypropylene was replaced with an equal amount of a cellulose nitrate plastic. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 22

Example 1 was repeated except that the polypropylene was replaced with an equal amount of a cellulose acetate plastic. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 23

Example 1 was repeated except that the polypropylene was replaced with an equal amount of polytetrafluoroethylene. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 24

Example 1 was repeated except that the polypropylene was replaced with an equal amount of polyvinyl fluoride. When the film was viewed through a microscope, no aggregates were visible. Spectrophotometric analysis showed a higher peak of reflectance than conventionally prepared dispersions. The color of the film did not have any unwanted sheen but was intense and lustrous and the color and its hue was fully developed and did not have any fading as found in prior art pigmented thermoplastics. Much higher than prior art pigment loading in the thermoplastic was achieved.

EXAMPLE 25

Example 1 was repeated except that the polypropylene was replaced with an equal amount of polybutadiene. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 26

Example 1 was repeated except that the polypropylene was replaced with an equal amount of phenoxy resin. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 27

Example 1 was repeated except that the polypropylene was replaced with an equal amount of a high-density polyethylene. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 28

Example 1 was repeated except that the polypropylene was replaced with an equal amount of polyphenylene oxide. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 29

Example 1 was repeated except that the polypropylene was replaced with an equal amount of polystyrene. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 30

Example 1 was repeated except that 50 grams of ricinoleic acid moneothanolamide was used in place of the hydroxystearic acid ethylenediamide and that 285 grams of titanium dioxide was used in place of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 31

Example 1 was repeated except that the polypropylene was replaced with an equal amount of polyvinyl chloride. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 32

Example 1 was repeated except that the polypropylene was replaced with an equal amount of a homopolymer (resin) prepared from diallyl phthalate. When the film was viewed through a microscope, no aggregate were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 33

Example 1 was repeated except that the polypropylene was replaced with an equal amount of a urea-formaldehyde resin. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 34

Example 1 was repeated except that the polypropylene was replaced with an equal amount of polybutadiene. When the film was viewed through a microscope, no aggregates were visible. Spectrophotometric analysis showed a higher peak of reflectance than conventionally prepared dispersion. The color of the film did not have any unwanted sheen but was intense and lustrous; and the color and its hue was fully developed and did not have any fading as found in prior art pigmented thermoset. Much higher than prior art pigment loading in the thermoset was achieved.

EXAMPLE 35

Example 1 was repeated except that the polypropylene was replaced with an equal amount of unsaturated polyester derived from maleic anhydride, phthalic anhydride, propylene glycol and styrene. When the film was viewed through a microscope, no aggregates were visible. Specrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 36

Example 32 was repeated except that 285 grams of titanium dioxide was used instead of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 37

Example 32 was repeated except that 285 grams of black iron oxide was used instead of the cadmium sulfide yellow. When the film was viewed through a microscope, no aggregates were visible. Spectrophotometric analaysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 38

Example 32 was repeated except that 50 grams of hydroxystearic acid monoethanolamide was used instead of the hydroxystearic acid ethylenediamide and that 200 grams of mercury cadmium sulfide red was used instead of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 39

Example 33 was repeated except that 50 grams of ricinoleic acid ethylenediamide was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 40

Example 34 was repeated except that 50 grams of ricinoleic acid ethylenediamide was used instead of the hydroxystearic acid ethylenediamide and that 200 grams of mercury cadmium sulfide red was used in place of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 41

50 grams of hydroxystearic acid ethylenediamide were placed in a resin kettle and melted at 200°C. The amide was gently agitated. 25 grams of phthalaocyanine blue was slowly added to the melted amide and a thick paste was obtained. The paste was then passed through a pair of cold rollers which had a nip distance of 0.008 inch and had surface tempratures of −10°C. The paste was solidified (it was cooled to room temperature by passing it through the cold rollers) and was in semicontinuous sheet form. The solidified sheets were ground into wafer-like fragments which had average dimensions of three-sixteenths inch by 0.010 inch. The grinding operation delivered a product which was screened to eliminate any traces of dust as well as very tiny commercially acceptable, fragmentary, particles. The product was thin comprised of wafer-like particles which had a length of about three-sixteenth of an inch. The bulk volume of the treated pigment was about one-half of an equal weight of the untreated pigment. The fragments were compounded in a screw injection molding machine with enough polypropylene particles to prepare a formulation having 10 parts of the pigments to 100 parts of the polypropylene. A 1 mil thick film was prepared by passing the formulation through a compression press. When the film was viewed through a microscope, no aggregates were visible. Specrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 42

Example 41 was repeated except that 50 grams of ricinoleic acid ethylenediamide was used instead of the hydroxystearic acid ethylenediamide. When the film was viewed through a microscope, no aggregates were visible. Spectrophotometric analysis showed a higher peak of reflectance than conventionally prepared dispersion. The color of the film did not have any fading as found in prior art pigmented thermoplastics. Much higher than prior art pigment loading in the thermoplastic was achieved.

EXAMPLE 43

Example 41 was repeated except that 50 grams of hydroxystearic acid monoethanolamide was used instead of the hydroxystearic acid ethylenediamide and that 33 grams of phthalocyanine green was used in place of the phthalocyanine blue. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 44

Example 41 was repeated except that 50 grams of hydroxystearic monoethanolamide was used instead of the hydroxystearic acid ethyleneamide and that 67 grams of aluminum lake red was used in place of the phthalocyanine blue. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 45

Example 41 was repeated except that 50 grams of ricinoleic acid ethylenediamide was used instead of the hydroxystearic acid ethylenediamide and that 33 grams of phthalocyanine green was used in place of the phthalocyanine blue. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 46

Example 41 was repeated except that 50 grams of ricinoleic acid ethylenediamide was used instead of the hydroxystearic acid ethylenediamide and that 67 grams of aluminum lake red was used in place of the phthalocyanine blue. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 47

Example 41 was repeated except that 30 grams of quinacridone violet was used in place of the phthalocyanine blue. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 48

Example 41 was repeated except that 33 grams of phthalocyanine green was used in place of the phthalocyanine blue. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 49

Example 41 was repeated except that 67 grams of aluminum lake red was used in place of the phthalocyanine blue. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art loading in the thermoplastic was achieved.

EXAMPLE 50

Example 31 was repeated except that 50 grams of hydroxystearic acid monoethanolamide was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 51

Example 41 was repeated except that the polypropylene was replaced with an equal amount of homopolymer (resin) of diallyl isophthalate. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 52

Example 41 was repeated except that the polypropylene was replaced with an equal amount of a melamine - formaldehyde resin. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 53

Example 51 was repeated except that 50 grams of ricinoleic acid ethylenediamide was used instead of the hydroxystearic acid ethylenediamide and that 30 grams of mercury cadmium sulfide red was used in place of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 54

A mixture of polyamines was condensed with a mixture of polymerized linoleic and oleic acid to form a polyamide. 50 grams of the polyamide was placed in a resin kettle and melted to 380°C. The polyamide was agitated. 150 grams of cadmium sulfide yellow was slowly added to the melted amide, and a thick creamy paste was obtained. The paste was then treated as in Example 1 and a sheet of pigment thermoplastic was obtained.

EXAMPLE 55

Example 1 was repeated except that the paste melted at 200°C. in the resin port was allowed to drop in temperature to room temperature by itself (without passing it through cold rollers). The paste was solidified and was in granular form. The granular material was ground. The granules of this example had a volume that was about twice that of the ground wafer-like fragments of Example 1.

EXAMPLE 56

Example 1 was repeated except that the heated thick paste of the hydroxystearic acid ethyleneamide and cadmium sulfide yellow was allowed to return to room temperature by itself without passing it through the cooled rollers. The cooled material was granular, and was not in wafer form, before being ground.

EXAMPLE 57

50 grams of hydroxystearic acid ethylenediamine were placed in a resin kettle and melted at 200°C. The amide was gently agitated. 150 grams of cadmium sulfide yellow was slowly added to the melted amide and a thick creamy paste was obtained. The creamy paste was placed in several low molds and allowed to solidify by cooling to room temperature. The solidified material was then particulated by passing it through a knife blade grinder. The fines and dust were screened out and then the over-sized particles were removed by passing them through a 1 1/16 inch screen. The bulk volume of the treated pigment was about one half that of an equal weight of the untreated pigment. Particles were compounded in a screw injection molding machine with enough polypropylene particles to prepare a formulation having 10 parts of the pigment to 100 parts of the polypropylene. A 1 mil thick film was prepared by passing the formulation through a compression press. When the film was viewed through a microscope, no aggregates were visible. The color of the film was exceptional.

EXAMPLE 58

Example 57 was repeated except that 50 grams of hydroxystearic acid monoethanolamine was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 59

Example 57 was repeated except that 50 grams of ricinoleic acid ethylenediamide was used instead of the hydroxystearic acid ethylenediamide and that 200 grams of mercury cadmium sulfide red was used in place of the cadmium sulfide yellow. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 60

Example 57 was repeated except that 50 grams of ricinoleic acid ethylenediamide was used instead of the hydroxystearic acid ethylenediamide and that 285 grams of black iron oxide was used in place of the cadmium sulfide yellow. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 61

Example 57 was repeated except that the creamy paste was kept in one container and was cooled to room temperature by placing the container in a refrigerator. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 62

Example 57 was repeated except that 50 grams of ricinoleic acid ethylenediamide was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 63

Example 57 was repeated except that 50 grams of ricinoleic acid ethylenediamide was used instead of the hydroxystearic acid ethylenediamide and that 200 grams of vat orange 3 was used in place of the cadmium sulfide yellow. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 64

Example 57 was repeated except that 50 grams of ricinoleic acid ethylenediamide was used instead of the hydroxystearic acid ethylenediamide and that 285 grams of aluminum flakes were used in place of the cadmium sulfide yellow. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 65

Example 57 was repeated except that the polypropylene was replaced with an equal amount of polymethyl methacrylate. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than than prior art pigment loading in the thermoplastic was achieved.

EXAMPLE 66

Example 57 was repeated except that the polypropylene was replaced with an equal amount of a cellulose acetate plastic. When the film was viewed through a microscope, no aggregates were visible. Spectrophotometric analysis showed a higher peak of reflectance than conventionally prepared dispersion. The color of the film did not have any fading as found in prior art pigmented thermoplastics. Much higher than prior art pigment loading was achieved.

EXAMPLE 67

Example 1 was repeated except that 50 parts of asbestos (as a filler) was compounded with the polypropylene and the coated pigment. When the film was viewed through a microscope, no aggregates were visible. Spectrophotometric analysis showed a higher peak of reflectance than conventionally prepared dispersions. The color of the film did not have any fading as found in prior pigmented thermoplastics. Much higher than prior art pigment loading in the thermoplastic was achieved.

EXAMPLE 68

Example 57 was repeated except that 50 grams of ricinoleic acid ethylenediamide was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 69

Example 57 was repeated except that 50 grams of ricinoleic acid ethylenediamide was used instead of the hydroxystearic acid ethylenediamide and that a mixture of 100 grams of chrome red and 50 grams of acid yellow 2 were used in place of the cadmium sulfide yellow. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 70

Example 57 was repeated except that 50 grams of an azo type toner was used in place of the cadmium sulfide yellow. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 71

Example 57 was repeated except that 50 grams of ricinoleic acid ethylenediamide was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any fading as found in prior pigmented thermoplastics. Much higher than prior art pigment loading in the thermoplastic was achieved.

EXAMPLE 72

Example 1 was repeated except that 100 grams of vat orange 3 was used in place of the cadmium sulfide yellow. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 73

Example 1 was repeated except that 50 grams of an azo type toner was used in place of the cadmium sulfide yellow. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 74

Example 57 was repeated except that the polypropylene was replaced with an equal amount of polytetrafuoroethylene. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 75

Example 1 was repeated except that 10 parts of polypropylene was used. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 76

Example 1 was repeated except that 3 parts of polypropylene was used. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 77

Example 57 was repeated except that 5 parts of polypropylene was used. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 78

Example 57 was repeated except that 35 parts of asbestos (as a filler) was compounded with the polypropylene and the coated pigment. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 79

Example 57 was repeated except that the polypropylene was replaced with an equal amount of polybutadiene. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 80

Example 57 was repeated except that the polypropylene was replaced with an equal amount of a high-density polyethylene. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 81

Example 1 was repeated except that 50 grams of a fatty acid amide prepared from methyl amine and stearic acid was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 82

Example 1 was repeated except that 50 grams of a fatty acid amide prepared from di-(heptadecyl) amide and linolenic acid was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 83

Example 1 was repeated except that 50 grams of a fatty acid amide prepared from octadecyl amide and formic acid was used instead of the hydroxystearic acid ethyleneamide. When the film was viewed through a microscope, no aggregates were visible. Spectrophotometric analysis showed a higher peak of reflectance than conventionally prepared dispersions. The color of the film did not have any fading as found in prior art

EXAMPLE 84

Example 57 was repeated except that 50 grams of a fatty acid amide prepared from ethyl amine and ricinoleic acid was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 85

Example 1 was repeated except that 50 grams of a fatty acid amide prepared from dihydroxypropyl amine and eleostearic acid was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 86

Example 57 was repeated except that 50 grams of a fatty acid amide prepared from N-propyl-dodecyl amine and stearic acid was used instead of the hydroxystearic acid ethyleneamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 87

Example 57 was repeated except that 50 grams of a fatty acid amide prepared from dodecyl diglycerol amide and eleostearic acid was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 88

Example 57 was repeated except that 50 grams of a fatty acid amide prepared from N-dodecyl-1,3-diaminopropane and oleic acid was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 89

Example 1 was repeated except that 50 grams of a fatty acid amide prepared from dodecylenic amine and peanut oil fatty acids was used instead of the hydroxystearic acid ethyleneamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 90

Example 1 was repeated except that 50 grams of a fatty acid amide prepared from diethylene triamine and capric acid was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 91

Example 57 was repeated except that the polypropylene was replaced with an equal amount of a homopolymer (resin) of diallyl phthalate. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 92

Example 57 was repeated except that the polypropylene was replaced with an equal amount of a homopolymer (resin) of diallyl maleate. When the film was examined microscopically, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 93

Example 91 was repeated except that 50 grams of ricinoleic acid ethylenediamide was used in place of the hydroxystearic acid ethylenediamide and that 117 grams of ultramarine blue was used in place of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 94

Example 91 was repeated except that 50 grams of ricinoleic acid monoethanolamide was used in place of the hydroxystearic acid ethylenediamide. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 95

Example 92 was repeated except that 50 grams of ricinoleic acid ethylenediamide was used instead of the hydroxystearic acid ethyleneamide and that 30 grams of titanium dioxide was used in place of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 96

Example 92 was repeated except that 50 grams of ricinoleic acid ethylenediamide was used in place of the hydroxystearic acid ethylenediamide and that 285 grams of black iron oxide was used in place of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 97

Example 57 was repeated except that the polypropylene was replaced with an equal amount of urea-formaldehyde resin. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 98

Example 57 was repeated except that the polypropylene was replaced with an equal amount of an epoxy resin prepared from epichlorohydrin and bisphenol A. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 99

Example 57 was repeated except that the polypropylene was replaced with an equal amount of a butadiene-styrene resin. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 100

Example 57 was repeated except that the polypropylene was replaced with twice as much of an unsaturated polyester derived from isophthalic acid, maleic anhydride, propylene glycol and styrene. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 101

Example 1 was repeated except that 6.8 grams of the monoamide dimer from hydroxystearic acid ethylenediamine was used in place of the trimer formed from the diamide of hydroxystearic acid ethylenediamine and that 38.6 grams of titanium dioxide ($TiO_2$) was used instead of the cadmium sulfide yellow. The resultant fatty acid amide had the following physical characteristics:

| | |
|---|---|
| Melting range: | 210° to 212°F. |
| Moisture: | 0.3 to 0.7 percent |
| Ash content: | 99.29 percent |
| Sp. Gr.: | 2.56 |
| Bulk volume: | ⅔ reduction factor (when compared with an equal weight of the untreated pigment) |

EXAMPLE 102

The ash content of 5 grams of pure titanium dioxide (used as the control) was 99.96 percent. The ash content of 5 grams of the novel coated pigment of Example 79 was 99.29 percent. The ash content of 5 grams of white concentrate PMS 350 nb White (which is the commercial designation for a typical prior art pigment formulation, the non-ash portion of which contained 10 percent of titanium dioxide and 90 percent of styrene) was 9.2 percent. A comparison of the above ash content indicates the total per cent solids in each pigment system. It can be deduced that the ash content of the novel coating pigment of Example 79 approaches the same level as the dry color pigment, therefore, its per cent solids is almost equal to that of the dry pigment ($TiO_2$). This cannot be duplicated by the prior art.

EXAMPLE 103

Example 102 was repeated. The resultant novel coated pigment by means of visual inspection, occupied about one-third the space of its initial dry admixed ingredients. The specific gravity of the novel coated pigment and its initial dry admixed ingredients indicated the same numerical value, however, the bulk volume of the novel coated pigment was greatly decreased. This decrease in bulk volume made it possible to disperse much more pigment in a thermoplastic material when injection molding equipment is used. Ten pounds of the novel coated pigment was easily compounded in 100 pounds of polypropylene. This result is not possible in the prior art when injection molding, etc., is used.

EXAMPLE 104

Example 1 was repeated except that 0.10 grams of Cyan Green (phthalocyanine type pigment) was used and 0.233 grams of the dimer from hydroxystearic acid ethylenediamine was used. A spectrographic analysis resulted in a Y-illuminant C value of 3.54 for the novel coated pigment. The Y value represents X' which is the value of ones color: Value indicating the dark to light — black to white factor, relative brightness or intensity.

An equivalent weight amount of Cyan Green and a simple cold mixture of hydroxystearic acid diethylenediamine was formulated in the same manner as above with the same amount of polypropylene. A spectrographic analysis resulted in a X' value of 6.24. The product containing the novel coated pigment has a much more intense color than the product containing the admixture of pigment and hydroxystearic acid ethylenediamine. This indicated better dispersion of the novel coated pigment.

An equivalent amount (weight) of Cyan Green was formulated in the same manner as above with the same amount of polypropylene. A spectrographic analysis resulted in a X' value of 7.46. The product containing the novel coated pigment had a much more intense color than the product containing Cyan Green. This indicated better dispersion of the novel coated pigment.

A lower X' value indicates a relatively better color value or more intense color.

Visual inspection of the above samples confirmed that much more intense color was possessed by the product containing the novel coated Cyan Green.

Slides of the product containing Cyan Green and of the product containing the novel coated Cyan Green were prepared. Microscopic examination established the presence of large agglomerates in the product containing Cyan Green and showed a much better dispersion in the product containing the coated Cyan Green.

EXAMPLE 105

50 grams of hydroxystearic acid ethylenediamide were placed in a resin kettle and melted at 200°C. The amide was gently agitated. 25 grams of copper phthalocyanine blue was slowly added to the melted amide and a thick paste was obtained. The paste was then passed through a pair of cold rollers which had a nip distance of 0.008 inch and had surface temperatures of −10°C. The paste was solidified (it was cooled to room temperature by passing it through the cold rollers) and was in semicontinuous sheet form. The solidified sheets were ground into wafer-like fragments which had average dimensions of three-sixteenth inch by 0.010 inch. The resultant fatty acid amide encapsulated pigments were termed the invention pigment.

The procedure of Example 1 of U.S. Pat. No. 3,582,384 was followed to prepare a comparison pigment formulation. 60 parts of polyethylene, having a mean molecular weight of 5400 was plasticated together with 10 parts of oleyl monoethanolamide in a heated kneader at from 90° to 95°C. While continuing the kneading 120 parts of copper phthalocyanine blue was added and the whole was continued for one hour at about 70° to 95°C. (That example of that patent used a pigment press cake, but a dry pigment was used so that the results could fairly and directly be compared.) The formulation obtained in this way was fairly viscous. It was cooled and granulated. The resultant pigment formulation was termed prior art pigment.

Each pigment formulation, on a basis of 100 grams of copper phthalo cyanine blue equivalent per 100 pounds of resin (uncolored, natural), and the resin was injected molded in a Battenfeld injection molder. The type of resin was varied: styrene (STY), low density polyethylene, (PE), polypropylene (P/P), high impact styrene (HIS) and linear polyethylene (LIN) being used. The chips all had the same thickness.

In the evaluation of a color dispersion, several factors are to be considered. First, transparency is one method in determining the degree of dispersion, hence if an equivalent amount of pigment is employed in two samples, and one is more translucent than the other, the clearest sample is better dispersed. This is due to a physical phenomena of light described in the attached copy of basic state of art literature (Color in Business, Science and Industry, Jud, Deane B., John Wiley & Son., Inc, of New York, Second Edition, page 381).

The pigmented resin chips containing the invention pigment were more translucent and had far fewer pigment agglomerations than did the pigmented resin chips containing the prior art pigment, which indicated that unexpectedly there was far better color development when the pigments of this invention were used.

Also much more true surface color was unexpectedly obtained when the pigment formulations of this invention were used. (Another factor determining the degree of a colorant's dispersion is the plastic surface color, i.e., if a blue hue with a greenish undertone is the classical characteristic of a pigment — the more this characteristic is visible, the more efficient the colorant would be considered.)

A spectral curve of each of the above mentioned pigmented plastic chips was drawn on a Trilac recording, visible range spectrophotometer, from Kollmorgan Corp, using a white ceramice background. (Visual observations concurred with the spectral curves in each case, thereby providing an acceptable "visual observer" reference check.)

In all cases, the amount of colorant reflected (blue) by the resins containing the invention pigment was higher than that by the resins containing the prior art pigment. Even when the resin was low molecular weight polyethylene, the results obtained using the invention pigment were unexpectedly better. When the other test resins were used, the results obtained using the invention pigment were unexpectedly vastly superior. The invention pigment is a universal pigment in that it can be placed in any resin with excellent resultant pigment development and compatibility with the resin.

Visual observance of the chips readily shows that the transmittal light was universally greater with the invention chips than with the prior art chips. Also the invention chips are less opaque and there are very few, if any, agglomerates visible in the invention chips.

EXAMPLE 106

50 grams of hydroxystearic acid ethylenediamide were placed in a resin kettle and melted at 200°C. The amide was gently agitated. 25 grams of copper phthalocyanine blue was slowly added to the melted amide and a thick paste was obtained. The paste was then passed through a pair of cold rollers which had a nip distance of 0.008 inch and had surface temperatures of −10°C. The paste was solidified (it was cooled to room temperature by passing it through the cold rollers) and was in semicontinuous sheet form. The solidified sheets were ground into wafer-like fragments which had average dimensions of three-sixteenth inch by 0.010 inch. The resultant fatty acid amide encapsulated pigments was termed the in invention pigment.

The above was repeated, except that lubricant in amount equivalent to that used in Example 8 of U.S. Pat. No. 3,197,425 (was used in some ratio and amount) was also used in the formulation. 20 grams of the above fatty acid amide, 40 grams of the above pigment and 20 grams of calcium stearate were used.

The procedure of Example 8 of U.S. Pat. No. 3,197,425 was followed to prepare a comparison pigment formulation. 20 grams of the above fatty acid amide, and 20 grams of calcium stearate (lubricant) were mixed and milled for 15 minutes. The mixture was mixed with 40 grams of the above pigment and then milled together in a colloplex mill for 15 minutes. The resultant pigment formulation was termed the prior art pigment.

All three products were admixed at equivalent blue pigment loading at 10 percent by weight pigment concentration in polyethylene. The products were placed on a two roll mill and mixed; samples were removed at 5 minute intervals at identical mill conditions for a 30 minute period. The samples obtained were pressed out with a die at 0.038 inch in a hot compression press at 300°F. Samples were removed at 5, 10, 15, 20, 25, and 30 minute intervals, thereby determining the amount of color development with shear time. The chips had the same thickness.

Trilar spectrophotometer transmissions curves of the samples indicate the degree of dispersion by the amount of translucency because copper phthalo cyanine blue is a transparent pigment when completely dispersed. Such transmission curves (visible range) were prepared.

Evalution of the curves indicate that after 5 minutes of mixing, the invention product gave a significantly better dispersion than the equivalent product of U.S. Pat. No. 3,197,425. Unexpectedly the lubricant containing product was inferior to the invention product obtained molten process, but superior to the milled product of U.S. Pat. No. 3,197,425. Visual observation of the translucency in the sample chips at 5 minutes appeared to confirm the spectrophotometric result. The succeeding 10, 15, 20, 25 and 30 minute samples demonstrated a trend in which the novel molten process was more transparent in every case, with some development in color evident. The molten product containing the lubricant appeared to be developing with mechanical shear, however the novel straight molten product surprisingly still gave superior results. The product of the U.S. Pat. No. 3,197,425 appeared to be developing with shear, however, in no case did it attain the color development of either the novel molten product alone, or with a lubricant. A curve was drawn which overlayed all three products at the extremes of color development, i.e., 5 minutes and 30 minutes, respectively. It appeared clearly evident that the novel molten fatty acid amide process of this application developed the pigment faster and further that the same molten product with lubricant or the product formed by U.S. Pat. No. 3,197,425. The fact that the lubricant appeared to have a detrimental effect in the novel molten process, which by definition is essential within the milling procedures of U.S. Pat. No. 3,197,425, indicated the unique superiority of the novel molten process over U.S. Pat. No. 3,197,425. The novel invention process produced a product which is essentially fixed in color development, thus giving the tremendous advantage of color reproducibility from batch to batch.

EXAMPLE 107

50 grams of hydroxystearic acid ethylenediamide were placed in a resin kettle and melted at 200°C. The amide was gently agitated. 70 grams of cadmium sulfide yellow was slowly added to the melted amide. 20 ml of mineral oil was slowly added to the admixture of melted fatty acid amide and pigment. The resultant liquid admixture was allowed to cool to room temperature, a paste resulting. The paste was compounded in a screw injection molding machine with enough polypropylene particles to prepare a formulation having 10 parts of the pigment to 100 parts of the polypropylene. A 1 mil thick film was prepared by passing the formulation through a compression press. When the film was viewed through a microscope, no aggregates were visible. The color of the film was exceptional.

EXAMPLE 108

Example 107 was repeated except that 80 grams of hydroxystearic acid monoethanolamine was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 109

Example 107 was repeated except that 50 grams of reinoleic acid ethylenediamide diamide was used instead of the hydroxystearic acid ethylenediamide and that 200 grams of mercury cadmium sulfide red was used in place of the cadmium sulfide yellow. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 110

Example 107 was repeated except that 50 grams of ricinoleic acid ethylenediamide was used instead of the hydroxystearic acid ethylenediamide and that 285 grams of black iron oxide was used in place of the cadmium sulfide yellow. The paste was formed by cooling to room temperature. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 111

Example 107 was repeated except that 30 grams of ricinoleic acid ethylenediamide was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 112

Example 107 was repeated except that 50 grams of ricinoleic acid ethylenediamide was used instead of the hydroxystearic acid ethylenediamide and that 200 grams of vat orange was used in place of the cadium sulfide yellow. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 113

Example 107 was repeated except that the polypropylene was replaced with an equal amount of polymethyl methacrylate. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 114

Example 107 was repeated except that the polypropylene was replaced with twice as much cellulose acetate plastic. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 115

Example 107 was repeated except that 10 parts of asbestos (as a filler) was compounded with the polypropylene and the coated pigment. When the film was viewed through a microscope, no aggregates were visible. Spectrophotometric analysis showed a higher peak of reflectance than conventionally prepared dispersions. The color of the film did not have any fading as found in prior pigmented thermoplastics. Much higher than prior art pigment loading in the thermoplastic was achieved.

EXAMPLE 116

Example 107 was repeated except that the polypropylene was replaced with an equal amount of a homopolymer (resin) of diallyl phthalate. When the film was viewed through a microscope, no aggregates were visible. Spectrophotometric analysis showed a higher peak of reflectance than conventionally prepared dispersions. The color of the film did not have any fading as found in prior art pigmented thermosets. Much higher than prior art pigment loading was achieved.

EXAMPLE 117

Example 107 was repeated except that 70 parts of a ureaformaldehyde resin was used in place of the polypropylene. When the film was viewed through a microscope, no aggregates were visible. Spectrophotometric analysis showed a higher peak of reflectance than conventionally prepared dispersions. The color of the film did not have any fading as found in prior art pigmented thermosets. Much higher than prior art pigment loading was achieved.

EXAMPLE 118

Example 107 was repeated except that the polypropylene was replaced with twice as much of a furan resin derived from furfuryl alcohol. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 119

Example 107 was repeated except that 30 grams of glycerol was used instead of the mineral oil. When the film was viewed through a microscope, no aggregates were visible. Spectrophotometric analsyis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 120

Example 107 was repeated except that 20 grams of methyl acetate was used instead of the mineral oil. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 121

Example 107 was repeated except that 10 grams of Duponal WAQ was used in place of the mineral oil. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 122

Example 107 was repeated except that 20 grams of castor oil was used instead of the mineral oil. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 123

70 grams of cadmium sulfide yellow and 20 ml. of mineral oil were admixed in a resin kettle, and heated to 200°C. The admixture was gently stirred. 50 grams of hydroxystearic acid ethylenediamine were added to the admixture. The resultant liquid admixture was allowed to cool to room temperature, a paste forming. The paste was compiunded in a screw injection molding machine with enough polypropylene particles to prepare a formulation having 10 parts of the pigment to 100 parts of the polypropylene. A 1 mil thick film was prepared by passing the formulation through a compression press. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 124

Example 123 was repeated except that 100 grams of titanium dioxide was used instead of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 125

Example 123 was repeated except that 117 grams of ultramarine blue was used instead of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 126

Example 1 was repeated except that 50 grams of hydroxystearic acid monoethanolamide was used instead of the hydroxystearic acid ethylenediamine. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 127

Example 123 was repeated except that 80 grams of ricinoleic acid ethylenediamine was used instead of the hydroxystearic acid ethylenediamine. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 128

Example 123 was repeated except that 50 grams of ricinoleic acid ethylenediamine was used instead of the hydroxystearic acid ethylenediamine and that 80 grams of mercury cadmium sulfide red was used in place of the cadmium sulfide yellow. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 129

Example 123 was repeated except that the polypropylene was replaced with an equal amount of an ABS resin prepared from acrylonitrite, butadiene and styrene. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 130

Example 123 was repeated except that the polypropylene was replaced with twice as much polymethyl methacrylate. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 131

Example 123 was repeated except that the polypropylene was replaced with an equal amount of a cellulose acetate plastic. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 132

Example 123 was repeated except that the polypropylene was replaced with an equal amount of polytetrafluoroethylene. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 133

Example 123 was repeated except that the polypropylene was replaced with an equal amount of a homopolymer (resin) of diallyl maleate. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 134

Example 123 was repeated except that the polypropylene was replaced with an equal amount of a acrylamide resin. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 135

Example 123 was repeated except that the polypropylene was replaced with an equal amount of polyvinyl fluoride. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have a fading as found in prior art pigmented thermosets. Much higher than prior art pigment loading in the thermoset was achieved.

EXAMPLE 136

Example 123 was repeated except that the polypropylene was replaced with an equal amount of polybutadiene. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 137

Example 123 was repeated except that 20 grams of glycerol was used instead of the mineral oil. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 138

Example 123 was repeated except that 20 grams of castor oil acid ethylenediamide was used in place of the mineral oil. When the film was viewed through a microscope, no aggregates were visible. Spectrophotometric analysis showed a higher peak of reflectance than conventionally prepared dispersions. The color of the film did not have any unwanted sheel but was intense and lustrous; and the color and its hue was fully developd and did not have any fading as found in prior art pigmented thermoplastics. Much higher than prior art pigment loading in the thermoplastic was achieved.

EXAMPLE 139

20 ml. of mineral oil were placed in a resin kettle and heated to 200°C. The contents of the kettle were gently stirred. 70 grams of cadmium sulfide yellow and 50 grams of hydroxystearic acid ethylenediamide were added to the heated mineral oil. The resultant liquid admixture was allowed to cool to room temperature, a paste forming. The paste was compounded in a screw injection molding machine with enough polypropylene particles to prepare a formulation having 10 parts of the pigments to 100 parts of the polypropylene. A 1 mil thick film was prepared by passing the formulation through a compression press. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 140

Example 139 was repeated except that 50 grams of ricinoleic acid monoethanolamide was used in place of the hydroxystearic acid ethylenediamide. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 141

20 ml. of mineral oil were placed in a resin kettle. The contents of the kettle were gently stirred. A particulate pigment composition (containing 70 grams of cadmium sulfide yellow and 50 grams of hydroxystearic acid ethylenediamide) prepared as in Example 57 were added to the heated mineral oil. A paste was formed. The paste was compounded in a screw injection molding machine with enough polypropylene particles to prepare a formulation having 10 parts of the pigments to 100 parts of the polypropylene. A 1 mil thick film was prepared by passing the formulation through a compression press. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 142

Example 141 was repeated except that 50 grams of ricinoleic acid ethylenediamide was used instead of the hydroxystearic acid ethylenediamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 143

Example 141 was repeated except that 30 grams of hydroxystearic acid monoethanolamide was used instead of the hydroxystearic acid ethylenediamide and that 33 grams of phthalocyanine blue was used in place of the cadmium sulfide yellow. Also the mineral oil was heated to 40°C. before the pigment composition was added, and the admixture was allowed to cool to room temperature, a paste forming. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 144

Example 141 was prepared except that 65 grams of hydroxystearic monoethanolamide was used instead of the hydroxystearic acid ethylenamide and that 85 grams of aluminum lake red was used in place of the cadmium sulfide yellow. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 145

Example 141 was repeated except that the polypropylene was replaced with an equal amount of phenoxy resin. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastics was achieved.

EXAMPLE 146

Example 141 was repeated except that the polypropylene was replaced with an equal amount of a homopolymer (resin) of diallyl phthalate. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 147

Example 141 was repeated except that the polypropylene was replaced with an equal amount of a urea-formaldehyde resin. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermosets. Much higher than prior art pigment loading in the thermoset was achieved.

EXAMPLE 148

Example 141 was repeated except that the polypropylene was replaced with an equal amount of polystyrene. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 149

Example 141 was repeated except that 20 grams of castor oil was used in place of the mineral oil. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 150

Example 141 was repeated except that 20 grams of glycerol was used in place of the mineral oil. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 151

Example 45 was repeated except that a press cake of phthalocymine blue was used in place of the phthalocyanine blue. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 152

Example 45 was repeated except that a press cake of phthalocyamine green was used in place of the phthalocyanine blue, and a urea-formaldehyde resin was used in place of the polypropylene. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoset was achieved.

EXAMPLE 153

70 grams of cadmium sulfide yellow and 50 grams of formamide were admixed in a resin kettle (at room temperature), a paste forming. The paste was compounded in a screw injection molding machine with enough polypropylene particles to prepare a formulation having 10 parts of the pigments to 100 parts of the polypropylene. A 1 mil thick film was prepared by passing the formulation through a compression press. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 154

Example 153 was repeated except that 67 grams of aluminum lake red was used in place of the phthalocyanine blue. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 155

Example 153 was repeated except that 70 grams of partially amidized castor oil (fatty acids) was used instead of the formamide. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 156

Example 153 was repeated except that a diallyl phthalate resin was used instead of the propylene. When the film was viewed through a microscope, no aggregates were visible. Spectrophotometric analysis showed a higher peak of reflectance than conventionally prepared dispersions. The color of the film did not have any fading as found in prior art pigmented thermosets. Much higher than prior art pigment loading was achieved.

This invention also includes a process of preparing pigments in a liquid or paste form for compounding with thermoplastics, theremosets and combinations thereof. The process involves admixing an amide hydroxy wax, a standard grinding polyester and one or more pigments (in particle form) heating the admixture to a molten state (for the polyester), and cooling the admixture to room temperature, a liquid or paste or suspension resulting. Alternatively, (i) the polyester can first be melted and then the pigment and amide hydroxy wax added, or (ii) the amide hydroxy wax is melted and then the polyester and pigment particles added, or (iii) the polyester and the amide hydroxy wax melted and then the pigment particles added. The resultant liquid is compounded with thermoplastics, thermosets and combinations thereof, the compounding step not needing to utilize any solvent. This invention also includes the resultant liquid or paste or suspension (of pigment in the polyester).

Preferably the heating temperature is around 300°C. Preferably the standard grinding polyester is a polyester formed from maleic anhydride and at least one unsaturated aliphatic alcohol. The standard grinding polyesters are a type of non-solvent diluent which are solid at the start of the process.

The paste or suspension can contain about 2 to 90 weight percent of the pigment and about 2 to 90 weight percent of the polyester.

Usually the amide hydroxy waxes are ricinoleamides or hydroxystearamides. Ricinoleamides and hydroxystearamides are produced by the reaction of various amides with the carboxyl group of ricinoleic and hydroxystearic acid, respectively. Possessing one or more hydroxyl groups in the molecule, these amides are high-melting wax-like materials of excellent lubricity. These products display extreme alkali resistance which is in sharp contrast to other natural waxes. The preferred amide hydroxy wax is Parcin 220 (a trademark of The Baker Castor Oil Company), which is N(2 hydroxy ethyl)-12 hydroxysteamide (m.p. = 102°C). Examples of useful amide hydroxy waxes are N(beta hydroxy ethyl) ricinoleamide, N,N'ethylene bis-ricinoleamide, N stearyl 12 hydroxystearamide and N,N' ethylene bis 12-hydroxystearamide.

EXAMPLE 157

363.30 grams of polyester vehicle Q-6257 (trade name of the Ashland Chemical Co.), 18.18 grams of P-220, 067 grams of Tan 5354 (pigment), 0.11 grams of 155 Black (pigment), 8.59 grams of Chrome Yellow Medium (pigment), and 63.25 grams of R-101 (tradename of a DuPont $TiO_2$ oigment) were placed in a resin kettle and heated to 300°C. The admixture was gently agitated, and then cooled to room temperature. A paste or suspension resulted. The paste was compounded in a screw injection molding machine with enough polypropylene particles to prepare a formulation having 10 parts of the pigments to 100 parts of the polypropylene. No aggregates were visible under a microscope; higher than prior art pigment loadings were obtained; and the color and hue were fully developed.

EXAMPLE 158

363.3 grams of polyester vehicle Q-6257 (trade name of the Ashland Chemical Co.), 18.34 grams of P-220, 0.17 grams of 155 Black (pigment), 0.77 grams of Cyano Blue (pigment), and 71.52 grams of R-101 (tradename of DePont $TiO_2$ pigment) were placed in a resin kettle and heated to 300°C. The admixture was gently agitated, and then cooled to room temperature. A paste or suspension resulted. The paste was compounded in a screw injection molding machine with enough polypropylene particles to prepare a formulation having 10 parts of the pigments to 100 parts of the polypropylene. No aggregates were visible under a microscope; higher than prior art pigment loadings were obtained, and the color and hue were fully developed.

EXAMPLE 159

62.83 grams of polyester vehicle 1208-A (trade name of the W.R. Grace Co.), 2.70 grams of P-220, 3.01 grams of Cyano Blue (pigment), 0.16 grams of Pearless 155 Black (pigment), 0.80 grams of Chrome Yellow Light (pigment), and 20.51 grams of R-101 (trade name of a DuPont $TiO_2$ pigment) were placed in a resin kettle and heated to 300°C. The admixture was gently agitated, and then cooled to room temperature. A paste or suspension resulted. The paste was compounded in a screw injection molding machine with enough polypropylene particles to prepare a formulation having 10 parts of the pigments to 100 parts of the polypropylene. No aggregates were visible under a microscope; higher than prior art pigment loadings were obtained; and the color and hue were fully developed.

EXAMPLE 160

363.2 grams of polyester vehicle Q-6257 (trade name of the Ashland Chemical Co.), 25.16 grams of P-220, 22.80 grams of Cyano Green (pigment), 5.87 grams of 155 Black (pigment), and 36.97 grams of R-101 (tradename of a DuPont $TiO_2$ pigment) were placed in a resin kettle and heated to 300°C. The admixture was gently agitated, and then cooled to room temperature. A paste or suspension resulted. The paste was compounded in a screw injection molding machine with enough polypropylene particles to prepare a formulation having 10 parts of the pigments to 100 parts of the polypropylene. No aggregates were visible under a microscope; higher than prior art pigment loadings were obtained; and the color and hue were fully developed.

EXAMPLE 161

380.20 grams of polyester vehicle Q-6257 (trade name of the Ashland Chemical Co.), 6.71 grams of P-220 and 67.09 grams of 155 Black (pigment) were placed in a resin kettle and heated to 300°C. The admixture was gently agitated, and then cooled to room temperature. A paste or suspension resulted. The paste was compounded in a screw injection molding machine with enough polypropylene particles to prepare a formulation having 10 parts of the pigments to 100 parts of the polypropylene. No aggregates were visible under a microscope; higher than prior art pigment loading were obtained; and the color and hue were fully developed.

EXAMPLE 162

308.54 grams of polyester vehicle Q-6257 (trade name of the Ashland Chemical Co.), 13.22 grams of P-220 and 132.23 grams of Y-787 (Crome Yellow Kroylar) were placed in a resin kettle and heated to 300°C. The admixture was gently agitated, and then cooled to room temperature. A paste or suspension resulted. The paste was compounded in a screw injection molding machine with enough polypropylene particles to prepare a formulation having 10 parts of the pigments to 100 parts of the polypropylene. No aggregates were visible under a microscope; higher than prior art pigment loadings were obtained; and the color and hue were fully developed.

EXAMPLE 163

272.96 grams of polyester vehicle Q-6257 (trade name of the Ashland Chemical Co.), 16.01 grams of P-220, 22.56 grams of Tan 5354 (pigment), 1.26 grams of 155 Black (pigment), 37.87 grams of Chrome Green (pigment), 40.76 grams of Chrome Yellow Light (pigment) and 62.6 grams of R-101 (tradename of a DuPont $TiO_2$ pigment) were placed in a resin kettle and heated to 300°C. The admixture was gently agitated, and then cooled to room temperature. A paste or suspension resulted. The paste was compounded in a screw injection molding machine with enough polypropylene particles to prepare a formulation having 10 parts of the pigments to 100 parts of the polypropylene. No aggregates were visible under a microscope; higher than prior art pigment loadings were obtained; and the color and hue was fully developed.

EXAMPLE 164

363.2 grams of polyester vehicle 1208-A (trade name of the W.R. Grace & Co.), 18.16 grams of P-220, 5.45 grams of 155 Black (pigment), and 67.19 grams of R-101 (tradename of a DuPont $TiO_2$ pigment) were placed in a resin kettle and heated to 300°C. The admixture was gently agitated, and then cooled to room temperature. A paste or suspension resulted. The paste was compounded in a screw injection molding machine with enough polypropylene particles to prepare a formulation having 10 parts of the pigments to 100 parts of the polypropylene. No aggregates were visible under a microscope; higher than prior art pigment loadings were obtained; and the color and hue were fully developed.

EXAMPLE 165

227.0 grams of polyester vehicle Q-6257 (trade name of the Ashland Chemical Co.), 18.18 grams of P-220 and 204.3 grams of R-101 (tradename of a DuPont TiO₂ pigment) were placed in a resin kettle and heated to 300°C. The admixture was gently agitated, and then cooled to room temperature. A paste or suspension resulted. The paste was compounded in a screw injection molding machine with enough polypropylene particles to prepare a formulation having 10 parts of the pigments to 100 parts of the polypropylene. No aggregates were visible under a microscope; higher than prior art pigment loadings were obtained; and the color and hue were fully developed.

This following example illustrates another aspect of this invention:

EXAMPLE 166

90.73 grams of P-220, 4.94 grams of Tan 5354 (pigment), 0.55 grams of 155 Black (pigment), 61.68 grams of Chrome Yellow Medium (pigment), and 296.10 grams of R-101 (tradename of a DuPont TiO₂ pigment) were placed in a resin kettle and heated to 300°C. No polyester is present. The admixture was gently agitated, and then cooled to room temperature. A paste or suspension resulted. The paste was compounded in a screw injection molding machine with enough polypropylene particles to prepare a formulation having 10 parts of the pigments to 100 parts of the polypropylene. No aggregates were visible under a microscope; higher than prior art pigment loadings were obtained; and the color and hue were fully developed.

This invention also includes preparing a liquid or paste or suspension composition containing a methoxylated castor oil and a pigment (particles) for compounding with thermoplastics, thermosets and combinations thereof. The process includes admixing the two components, heating the admixture to at least the melting point of the oil (wax), and cooling to room temperature to form the paste or suspension. No heating or cooling step is needed if a methoxylated castor oil is used. This invention also includes the paste or suspension composition. (All pastes, etc., in this application are probably soliates or suspensions.)

Castor oil is a triglyceride (ester) of fatty acids. About 90 percent of the fatty acid content is ricinoleic acid, an 18-carbon acid having a double bond in the 9-10 position and a hydroxyl group on the 12th carbon.

Examples of useful methoxylated castor oils (water soluble waxes) are EW 535 E (liquid at room temperature), EW 535 A (m.p. = 53° to 55°C), EW 535 B (m.p. = 49° to 52°C.) and EW 535 C (m.p. = 43° to 47°C.). The higher the last letter in the EW series, the lower the molecular weight. The preferred one is EW 535 E. The EW series are manufactured by the Baker Castor Oil Company. The lower the amount of residual hydroxyl groups, the lower the excretion or migration of pigment and/or oil out of the plastic into which it has been incorporated. The paste or suspension can contain 10 to 90 weight percent of the pigment and 90 to 100 weight percent of the methoxylated castor oil. Preferably the ratio is 50:50.

EXAMPLE 167

50 grams of EW 535 E and 50 grams of cyano blue pigment (particles) were admixed and agitated. A paste or suspension resulted. The paste was compounded in a screw injection molding machine with enough polypropylene particles to prepare a formulation having 10 parts of the pigment to 100 parts of the propylene.

What is claimed is:

1. The process of preparing coated pigment particles in a liquid form, for compounding with a thermoplastic, a thermoset and combinations thereof which comprises: (a) preparing a liquid heated admixture of a molten fatty acid amide, pigment particles and a non-solvent diluent, said pigment not being soluble in said thermoplastic, said thermoset and combinations thereof, said fatty acid amide being solid at room temperature, said non-solvent diluent being selected from the group consisting of (i) a non-solvent liquid fatty acid ester which is selected from the group consisting of ethyl formate, ethyl caprylate, ethyl propionate, ethyl butyrate, propyl acetate, butyl acetate, butyl formate and methyl butyrate, (ii) a liquid wetting-agent which is selected from the group consisting of a liquid sodium salt of an alcohol sulfate, a liquid amine salt of an alcohol sulfate, a liquid alcohol phosphate, a liquid aliphatic sulfonate, a liquid alkylaryl sulfonate, a liquid alcohol/ethylene oxide adduct, a liquid alkyl betaine - C type, a liquid alkyl betaine - N type, and a compound having the formula:

wherein R is alkyl and $n$ is the number of moles of ethylene oxide, (iii) a non-solvent liquid vegetable oil which is selected from the group consisting of castor oil, olive oil, peanut oil, rape oil, corn oil, soybean oil, linseed oil, tung oil, and oiticica oil, (iv) a non-solvent liquid animal oil which is selected from the group consisting of lard oil, neat's foot oil, whale oil and fish oil, (v) a non-solvent liquid glycol which is selected from the group consisting of ethylene glycol, propylene glycol and 1,3-butylene glycol, (vi) glycerol, (vii) a mineral oil and (viii) combinations thereof, the amine radical or radicals in the fatty acid amide containing 0 to 36 carbon atoms, the fatty acid radical or radicals in the fatty acid amide containing 1 to 36 carbon atoms, and said fatty acid amide can be substituted by hydroxyl groups, and (b) cooling the admixture to room temperature.

2. The process of claim 1 wherein a paste results when said admixture is cooled.

3. The process of claim 1 which comprises: (i) preparing a heated liquid admixture of said melted fatty acid amide and said pigment particles; (ii) adding said non-solvent diluent to the fluid admixture; and (iii) cooling the admixture of step (ii), a paste resulting.

4. The process of claim 1 wherein the diluent is mineral oil.

5. The process of claim 1 wherein the fatty acid amide is hydroxystearic acid ethylene diamide.

6. The process of claim 1 which comprises: (i) admixing said pigment particles and said non-solvent diluent;

(ii) heating the admixture of step (a) to a temperature at which said fatty acid amide is in the molten state; (iii) admixing said fatty acid specified in step (ii) with the heated admixture of step (i) and (iv) cooling the admixture of step (iii), a paste resulting.

7. The process of claim 6 wherein the admixture of step (iii) is cooled to about room temperature.

8. The process of claim 6 wherein said diluent is mineral oil.

9. The process of preparing coated pigment particles in a liquid form, for compounding with a thermoplastic, a thermoset and combinations thereof which consists of (a) preparing a heated liquid admixture of a molten fatty acid amide, pigment particles and a non-solvent diluent said fatty acid amide being solid at room temperature, said non-solvent diluent being selected from the group consisting of (i) a non-solvent liquid fatty acid ester which is selected from the group consisting of ethyl formate, ethyl caprylate, ethyl propionate, ethyl butyrate, propyl acetate, butyl acetate, butyl formate and methyl butyrate, (ii) a liquid wetting agent which is selected from the group consisting of a liquid sodium salt of al alcohol sulfate, a liquid amine salt of an alcohol sulfate, a liquid alcohol phosphate, a liquid aliphatic sulfonate, a liquid alkylaryl sulfonate, a liquid alcohol/ethylene oxide adduct, a liquid alkyl betaine-C type, a liquid alkyl betaine-N type and a compound having the formula:

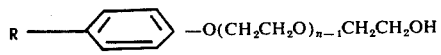

wherein R is alkyl and $n$ is the number of moles of ethylene oxide, (iii) a non-solvent liquid vegetable oil which is selected from the group consisting of castor oil, olive oil, peanut oil, rape oil, corn oil, soybean oil, linseed oil, tung oil, and oiticica oil, (iv) a non-solvent liquid animal oil which is selected from the group consisting of lard oil, neat's foot oil, whale oil and fish oil, (v) a non-solvent glycol which is selected from the group consisting of ethylene glycol, propylene glycol and 1,3-butylene glycol, (vi) glycerol, (vii) a mineral oil and (viii) combinations thereof, the amine radical or radicals in the fatty acid amide containing 0 to 36 carbon atoms, the fatty acid radical or radicals in the fatty acid amide containing 1 to 36 carbon atoms, and said fatty acid amide can be substituted by hydroxyl groups, and (b) cooling the admixture, a paste resulting.

10. The process of preparing coated pigment particles for compounding with a thermoplastic, a thermoset and combinations thereof which comprises admixing a non-solvent diluent with pigment particles which are encapsulated by a fatty acid amide, a paste forming, said non-solvent diluent being selected from the group consisting of (i) a non-solvent liquid fatty acid ester which is selected from the group consisting of ethyl formate, ethyl caprylate, ethyl propionate, ethyl butyrate, propyl acetate, butyl acetate butyl formate and methyl butyrate, (ii) a liquid wetting agent which is selected from the group consisting of a liquid sodium salt of an alcohol sulfate, a liquid amine salt of an alcohol sulfate, a liquid alcohol phosphate, a liquid aliphatic sulfonate, a liquid alkylaryl sulfonate, a liquid-/ethylene oxide adduct, a liquid alkyl betaine-C type, a liquid alkyl betaine-N type and a compound having the formula:

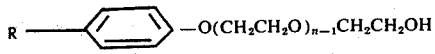

wherein R is alkyl and n is the number of moles of ethylene oxide, (iii) a non-solvent liquid vegetable oil which is slected from the group consisting of castor oil, olive oil, peanut oil, rape oil, corn oil, soybean oil, linseed oil, tung oil and oiticica oil, (iv) a non-solvent liquid animal oil which is selected from the group consisting of lard oil, neat's foot oil, whale oil and fish oil, (v) a non-solvent liquid glycol which is selected from the group consisting of ethylene glycol, propylene glycol and 1,3-butylene glycol, (vi) glycerol, (vii) a mineral oil and (viii) combinations thereof, the amine radical or radicals in the fatty acid amide containing 0 to 36 carbon atoms, the fatty acid radical or radicals in the fatty acid amide containing 1 to 36 carbon atoms, and said fatty acid amide containing can be substituted by hydroxyl groups.

11. The process of claim 10 wherein the admixing is done at about room temperature.

12. The process of claim 10 which comprises: (i) heating a non-solvent diluent to a temperature below that at which said fatty acid amide is in the molten state; (ii) admixing said heated non-solvent diluent with pigment particles which are encapsulated by said fatty acid amide; and (iii) cooling the admixture of step (ii) a paste forming.

13. The process of claim 12 wherein the admixture of step (ii) is cooled to about room temperature.

14. The process of claim 12 wherein said diluent is mineral oil.

15. The process of claim 12 wherein said fatty acid amide is hydroxystearic acid ethylene diamide.

16. The process of preparing coated pigment particles for compounding with a thermoplastic, a thermoset or combinations thereof which comprises preparing a liquid admixture of a partially amidized fatty acid amide which is liquid at room temperature and pigment particles, said partially amidized fatty acid amide being a partially amidized vegetable oil, partially amidized animal oil, partially amidized glycerides of fatty acids, partially amidized oleic acid, partially amidized linoleic acid or partially amidized ricinoleic acid, and said partially amidized fatty acid amide containing at least thirty percent of the theoretical amide linkages, but few enough amide linkages to keep said partially amidized fatty acid amide liquid at room temperature.

17. The process of preparing coated pigment particles for dry compounding with thermoplastics, thermosets and combinations thereof which comprises; (a) preparing a fluid admixture of a melted fatty acid amide and pigment particles, said fatty acid amide being solid at room temperature, (b) cooling the admixture until it is in a solidified state, the pigment particles being substantially encapsulated by the fatty acid amide, (c) particulating the solidified admixture, the amine radical or radicals in the fatty acid amide containing 0 to 36 carbon atoms, the fatty acid radical or radicals in the fatty acid amide containing 1 to 36 carbon atoms, and said fatty acid amide can be substituted by hydroxyl groups, and (d) removing the fines and dust are removed from said particulated solidified admixture.

18. The process of claim 17 wherein the fines and dust are removed from the particulated solidified admixture.

19. The process of claim 17 wherein cooling step (b) is achieved by letting fluid admixture (a) solidify by cooling to about room temperature.

20. The process of claim 17 wherein the particulation of the solidified admixture is achieved by grinding.

21. The process of preparing coated pigment particles for dry compounding with thermoplastics, thermosets and combinations thereof which comprises: (a) preparing a fluid admixture consisting of a least one melted fatty acid amide and pigment particles, the amine radical or radicals in the fatty acid amide containing 0 to 36 carbon atoms, the fatty acid radical or radicals in the fatty acid amide containing 1 to 36 carbon atoms, and said fatty acid amide can be substituted by hydroxyl groups; (b) passing the fluid admixture consisting of at least one fatty acid amide and pigment particles through a heated low-shear mixer; (c) cooling the admixture consisting of at least one fatty acid amide and pigment particles until it is in a solidified state, by passing the extruded fluid admixture through cooled rollers, whereby solid wafer-like flakes are formed, the pigment particles being substantially encapsulated by the fatty acid amide; and (d) particulating the solid wafer-like flakes.

22. The process of claim 21 wherein the cooled rollers have a surface temperature of less than 0°C.

23. The composition which consists of a fluid admixture of a fatty acid amide which is liquid at room temperature and pigment particles, said fatty acid amide being partially amidized vegetable oil, partially amidized animal oil, partially amidized glycerides of fatty acids, partially amidized oleic acid, partially linoleic acid or partially amidized ricinoleic acid, and said partially amidized fatty acid amide containing at least thirty percent of the theoretical amide linkages, but few enough linkages to keep said partially amidized fatty acid amide liquid at room temperature.

* * * * *